United States Patent
Yamazaki et al.

(10) Patent No.: US 6,765,586 B2
(45) Date of Patent: Jul. 20, 2004

(54) MEDIUM RECORDING COLOR TRANSFORMATION LOOKUP TABLE, PRINTING APPARATUS, PRINTING METHOD, MEDIUM RECORDING PRINTING PROGRAM, COLOR TRANSFORMATION APPARATUS, AND MEDIUM RECORDING COLOR TRANSFORMATION PROGRAM

(75) Inventors: Satoshi Yamazaki, Nagano (JP); Makoto Fujino, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/103,965

(22) Filed: Mar. 22, 2002

(65) Prior Publication Data

US 2003/0001860 A1 Jan. 2, 2003

(30) Foreign Application Priority Data

Mar. 26, 2001 (JP) .................................. 2001-087763
Oct. 30, 2001 (JP) .................................. 2001-333134

(51) Int. Cl.[7] .................................................. G09G 5/02
(52) U.S. Cl. ................................................... 345/590
(58) Field of Search .................... 345/590; 358/502, 358/504, 1.9

(56) References Cited

U.S. PATENT DOCUMENTS 5,309,257 A * 5/1994 Bonino et al. ............... 358/504
5,510,910 A * 4/1996 Bockman et al. ............ 358/502

FOREIGN PATENT DOCUMENTS

JP          2001-043344          2/2001

* cited by examiner

Primary Examiner—Matthew C. Bella
Assistant Examiner—Aaron M. Richer
(74) Attorney, Agent, or Firm—Beyer Weaver & Thomas LLP

(57) ABSTRACT

When printing a photograph including colors in the range of the green hue to the blue hue wherein the color gamut of the printer is wider in the direction of chroma rise, the colors of its print result will be poorer in tones than the colors of the actual subject. According to the present invention, color gamut shift is executed for gamut mapping in which the shape of the color gamut of the first image processing device expands so as to be close to the shape of the color gamut of the second image processing device in a homogenous hue range. Moreover, color gamut expansion is executed for gamut mapping in which a certain region of the resulting gamut after the color gamut shift further expands into the color gamut of the second image processing device. Based on the thus defined relationship, color transformation is executed.

29 Claims, 32 Drawing Sheets

L/Peak L (θ)

Fig. 20

| Ink Set | A (6 Colors) | | | | B (7 Colors) | | |
|---|---|---|---|---|---|---|---|
| Paper Type | photo1 | photo2 | Plain Paper | | photo1 | photo2 | Plain Paper |
| Color Gamut | Large | Medium | Small | | Large | Medium | Small |
| Color Gamut Shift | $\Delta C1$<br>$\Delta L1$<br>$RC1(\theta)$<br>$RL1(\theta)$ | $\Delta C2$<br>$\Delta L2$<br>$RC1(\theta)$<br>$RL1(\theta)$ | $\Delta C3$<br>$\Delta L3$<br>$RC2(\theta)$<br>$RL2(\theta)$ | | $\Delta C4$<br>$\Delta L4$<br>$RC1(\theta)$<br>$RL1(\theta)$ | $\Delta C5$<br>$\Delta L5$<br>$RC1(\theta)$<br>$RL1(\theta)$ | $\Delta C3$<br>$\Delta L3$<br>$RC2(\theta)$<br>$RL2(\theta)$ |
| Color Gamut Expansion | Rm1<br>$\alpha 1$<br>$\beta 1$<br>rate1 | Rm2<br>$\alpha 2$<br>$\beta 2$<br>rate2 | Rm3<br>$\alpha 3$<br>$\beta 3$<br>rate3 | | Rm2<br>$\alpha 1$<br>$\beta 1$<br>rate4 | Rm2<br>$\alpha 2$<br>$\beta 2$<br>rate5 | Rm3<br>$\alpha 3$<br>$\beta 3$<br>rate6 |
| LUT | 15b | 15c | 15d | | 15e | 15f | 15g |

Fig. 28

| Ink Set | A (6 Colors) | | | B (7 Colors) | | |
|---|---|---|---|---|---|---|
| Paper Type | photo1 | photo2 | Plain Paper | photo1 | photo2 | Plain Paper |
| Color Gamut | Large | Medium | Small | Large | Medium | Small |
| Color Gamut Shift | ΔC1<br>ΔL1<br>RC1(θ)<br>RL1(θ) | ΔC2'<br>ΔL2'<br>RC1(θ)<br>RL1(θ) | ΔC3<br>ΔL3<br>RC2(θ)<br>RL2(θ) | ΔC4<br>ΔL4<br>RC1(θ)<br>RL1(θ) | ΔC5'<br>ΔL5'<br>RC1(θ)'<br>RL1(θ) | ΔC3<br>ΔL3<br>RC2(θ)<br>RL2(θ) |
| Color Gamut Expansion | Rm1<br>α1<br>β1<br>rate1 | Rm2'<br>α2<br>β2<br>rate2 | Rm3<br>α3<br>β3<br>rate3 | Rm2<br>α1<br>β1<br>rate4 | Rm2<br>α2<br>β2<br>rate5 | Rm3<br>α3<br>β3<br>rate6 |
| L U T | 15b | 15c | 15d | 15e | 15f | 15g |

MEDIUM RECORDING COLOR TRANSFORMATION LOOKUP TABLE, PRINTING APPARATUS, PRINTING METHOD, MEDIUM RECORDING PRINTING PROGRAM, COLOR TRANSFORMATION APPARATUS, AND MEDIUM RECORDING COLOR TRANSFORMATION PROGRAM

BACKGROUND OF THE INVENTION

1. Field of the Invention

The present invention relates to a medium recording a color transformation lookup table for color transformation on printing, a printing apparatus and a printing method both using the color transformation lookup table, a medium recording a printing program, a color transformation apparatus, and a medium recording a color transformation program.

2. Description of the Prior Art

Image processing devices such as displays, printers have the device-dependent color gamut, that is, the range of colors producible by the device. When two image processing devices are compared in the aspect of colors, generally, some colors are producible on both devices; other colors are producible only on either device. For some image processing devices, despite having the ability of fine color reproduction, it was conventionally practiced to limit their color gamut to a certain extent enough to make their output look in homogenous colors to the human eyes. For example, assume that an image on a display is printed by a printer. In a color region where the color gamut of the display is wider than that of the printer, the colors visible on the display are mapped to fall within the color gamut of the display and the color gamut of the printer. Colors in another color region where the color gamut of the printer is wider than that of the display are not used when images are printed.

For conventional color transformation programs based on the above-described color-mapping method, a problem was posed which will be described below.

If an image presented on the display is printed, using the colors in a region that fall within both color gamuts of the display and of the printer, the colors of the printed image well match the colors of the image on the display. However, because colors out of the color reproducible range of the display are not produced by printing, best-quality print results are not always produced. For example, when printing a photograph including colors in the range of the green hue to the blue hue wherein the color gamut of the printer is wider in the direction of chroma rise, the colors of its print result will be poorer in tones than the colors of the actual subject.

SUMMARY OF THE INVENTION

To solve the problem, an object of the present invention is to provide a medium recording a color transformation lookup table, printing apparatus, printing method, a medium recording a printing program, a color transformation apparatus, and a medium recording a color transformation program, in order to permit an image processing device to produce desirable color image outputs by making more effective use of its color gamut.

In accordance with one aspect of the present invention, a medium recording a color transformation lookup table is provided. The color transformation lookup table is referenced for transformation of first color image data used on a first image processing device into second color image data used on a second image processing device and has a first set of values and a second set of values which represent a relationship between color gamuts of the first image processing device and the second image processing device, wherein if there exists the region that is out of the color gamut of the first image processing device but falls within the color gamut of the second image processing device in a certain hue of the device-independent color space, the relationship is equivalent to the relationship of color gamut determined, based on gamut mapping in a predefined device-independent color space, through a process comprising:

a color gamut shift step to obtain the mapping which expands the shape of the color gamut of the first image processing device so as to be close to the shape of the color gamut of the second image processing device in a homogeneous hue range; and a color gamut expansion step to obtain the mapping which expands a certain region of the resulting gamut processed at the color gamut shift step into the inside of color gamut of the second image processing device.

In the present invention of this aspect, by using a color transformation program that comprises the steps of inputting the first color image data for use on the first image processing device and transforming the first color image data into the second color image data for use on the second image output program, the first color image data is transformed into the second color image data, based on the relationship between color gamuts of the first image processing device and the second image processing device, which has been defined by the color gamut shift step. The color gamut shift step performs gamut mapping in which the shape of the color gamut of the first image processing device expands so as to be close to the shape of the color gamut of the second image processing device. In the predefined device-independent color space, this step is carried out in a hue in which a color region exists that is out of the color gamut of the first image processing device, but falls within the color gamut of the second image processing device.

When shifting the color gamut of the first image processing device, expansion rather than compression takes place so that the shape of the color gamut will be made close to the shape of the color gamut of the second image processing device. Consequently, if the color gamut of the second image processing device is wider than that of the first image processing device, the resulting gamut by shift maintains the characteristics of the color gamut of the first image processing device, while it is close to the characteristics of the color gamut of the second image processing device. Color gamut shift can take place without unnatural color transformation. By making the color gamut of the first image processing device close to the color gamut of the second image processing device, the region expands where the color gamut of the first image processing device overlaps with the color gamut of the second image processing device. This makes it possible to decrease the number of colors that are out of the color gamut of the second image processing device and increase the number of colors available on the second image processing device.

In order to obtain images with finer tones in a hue in which a color region exists that is out of the color gamut of the first image processing device, but falls within the color gamut of the second image processing device, following the color gamut shift step, the color gamut expansion step is carried out for gamut mapping in which a certain region of the resulting gamut after the color gamut shift further expands into the color gamut of the second image processing device. Consequently, the gamut obtained by shifting the color gamut of the first image processing device through the color gamut shift step is further modified to include colors that are out of the color gamut of the first image processing device, but fall within the color gamut of the second image output.

Color transformation of the first color image data into the second color image data, based on the finally obtained gamut, enables effective use of colors that are out of the color gamut of the first image processing device, but fall within the color gamut of the second image output. By using the color gamut shift step in combination with the color gamut expansion step as required, both unnatural color transformation prevention and effective use of the color gamut of the second image processing device can be achieved at the same time. The above-described process can be augmented by adding another step. For a region that still falls out of the color gamut of the second image processing device after the execution of the color gamut shift and color gamut expansion steps, it is advisable to compress the region into the color gamut and define the gamut mapping relationship between the first and second image processing devices.

In this way, according to the present invention, unnatural color transformation can be prevented with effective use of the color gamut of the second image processing device. Because color transformation is executed by simply referencing the color transformation lookup table, it is not necessary to execute the color gamut shift and color gamut expansion steps whenever transforming the first color image data into the second color image data. Thus, the resources or the like for performing the color transformation function can be saved.

As the device-independent color space, any of diverse color space schemes such as Lab, XYZ can be adopted as color space. The first and second image processing devices are not limited to specific ones and may be any device that reproduces images, using color image data such as displays, printers, scanners, digital cameras. These devices are not always separate ones. For example, a fax machine has a scanner as the first image processing device and a printer as the second image processing device, which are integrated therein, and the present invention can be applied to the fax machine. The above-described process does not actively cause color variation when being carried out in a certain hue. However, some color variation is allowable as difference between the hue of the second color image data and the hue of the first color image data due to the property of the device-independent color space in which the process is carried out, the transformation between spaces, and the device-dependent error of an image processing device, etc. Even if the process does not actively cause hue variation, hue variation of "0 to 10" degrees may take place over the region for which color gamut shift is executed.

To reflect the foregoing relationship of color gamut in image output, transformation of the first color image data into the second color image data is executed by referencing the lookup table created in advance. Owing to the information obtained about the relationship between the color gamuts of the first image processing device and the second image processing device defined in the lookup table created in advance, it is not necessary to execute the color gamut shift and color gamut expansion steps whenever transforming the first color image data into the second color image data. Thus, the resources for performing the color transformation function can be saved.

Requirements for the lookup table are containing data that defines the relationship between color gamuts of the first image processing device and the second image processing device so as to enable transformation of the first color image data into the second image data. In building this table, any of diverse method can be adopted. For example, one method is such that the table is built by mapping typical color data as the first color image data to corresponding data as the second color image data and color data for any point is calculated by interpolation. Another method is such that the table is built by mapping typical color values by the coordinates of the color gamut of the first image processing device to corresponding color values by the coordinates of the color gamut of the second image processing device in the device-independent color space and color values at any coordinates are calculated by interpolation.

By way of illustration, as suitable devices to which the present invention is applicable, the first image processing device is a display and the second image processing device is a printer. In this embodiment, the color transformation function is performed to transform the first color image data expressed in an RGB color space into the second color image data expressed in a CMYK color space on the assumption of the following. The first color image data is expressed in the predefined device-independent color space, the color gamut shift step or/and the color gamut expansion step are executed, and then the second color image data is obtained, based on the finally obtained gamut data in the predefined device-independent color space.

To perform management of color compatibility between the display and printer, it is required that a specific device-independent color space intervenes therebetween in transforming the first color image data expressed in the display's device-dependent or device-independent RGB color space into the second color image data expressed in the printer's device-dependent CMYK color space. By thus performing the above-described process of the present invention in the device-independent color space, the management of color compatibility as well as the above-described unnatural color transformation prevention and effective use of the color gamut of the second image processing device can be accomplished.

By comparison of the display's color gamut and the printer' color gamut, around the green hue to the blue hue, such a tendency is found that the display's color gamut is characterized by higher chroma in the high lightness range and the printer's color gamut higher chroma in the medium and low lightness range. In other words, the display's color gamut is greater in the high lightness range and the printer's color gamut is greater in the medium and low lightness range. On the assumption that the present invention is applied to the display and printer, the invention enables effective use of the printer's color gamut in the medium and low lightness range, so that print results featuring finer tones around the green hue to the blue hue can be produced.

Colors constituting the color gamut of an image processing device can be expressed by combinations of a plurality of color components. Color components used to express colors in a color space are usually three colors, but three colors are not always used for defining the relationship between color gamuts. Before or/and after the color gamut shift and color gamut expansion steps, the first set of values and second set of values of a color transformation lookup table are defined after increasing or decreasing the number of color components in a color space to which the color gamut belongs.

Specifically, by means of the color separation into color components, three color components in the device-independent color space can be changed to any number of color components. The relationship between the color gamuts of the first color data and the second color data can be defined to directly match the number of color components used by the image output device. For example, if the second image processing device is a printer, it is conceivable that color components such as four CMYK colors, six colors of CMYK plus lc (light cyan) and lm (light magenta), seven colors of CMYKlclm plus DY (dark yellow) are available on the printer. Once RGB color data from the display's color gamut has been mapped to CMY color data, the CMY color data is transformed into CMYK color data or the like by color separation into color components, so that RGB color data can easily be mapped to CMYK color data or the like.

In this way, the relationship between the color gamuts of the first color data and the second color data directly matching the number of color components used by the image output device can be obtained.

Requirements for the color gamut shift step are that it is capable of gamut mapping in which the shape of the color gamut of the first image processing device expands so as to be close to the shape of the color gamut of the second image processing device in a homogenous hue range. Requirements for the color gamut expansion step are that it is capable of gamut mapping in which a certain region of the resulting gamut after the color gamut shift further expands into the color gamut of the second image processing device. In one embodiment, it is advisable to effect these steps as follows. The color gamut shift step causes lightness to decrease and chroma to increase based on the coordinates of the device-independent color space; meanwhile the color gamut expansion step causes chroma to increase while keeping lightness nearly constant, based on the coordinates of the gamut processed at the color gamut shift step in the device-independent color space.

Among three attributes colors, i.e., hue, lightness, and chroma, the human eyes are normally most sensitive to hue change. Accordingly, the above-described process of the present invention does not actively cause hue change, or hue variation. As the color gamut shift step causes lightness to decrease and chroma to increase, the present invention can function effectively in circumstances where the color gamut of the first image processing device is greater in the high lightness range and the gamut of the second image processing device is greater in the medium and low lightness range. By decreasing lightness while increasing chroma, gamut mapping that does not cause unnatural color appearance to the human eyes can be obtained. As the color gamut expansion step causes chroma to increase while keeping lightness constant, the present invention can function effectively in circumstances where the gamut of the second image processing device extends wider in the high chroma range. In consequence, the second image processing device outputs fine tone color images.

In view of the foregoing, it is advisable to effect the color gamut shift step as follows. The mapping in the color gamut shift step is obtained in such a manner that the higher the chroma point is in the color gamut of the first image processing device in a certain hue, the greater the displacement by shift is. That is because difference in gamut shape between the image input device and output device is significant in the high chroma range, when the color gamut is expressed in the color space based on the lightness, chroma, and hue coordinates. Thus, when shifting the color gamut of the image input device, shifting the contour of its protrusion toward rise in chroma is important. Significant shift in the low chroma range may cause inherently little colorful colors to become colorful. Thus, the displacements are set such that more shift will take place in the higher chroma range. In consequence, color gamut shift without causing unnatural color appearance can be accomplished while significantly shifting the color gamut of the first image processing device so that it will expand so as to be close to the color gamut of the second image processing device.

The above-described color gamut shift step is executed for each hue and the color gamut shift results for all hues must give color values without causing unnatural color appearance as a whole. In view hereof, in yet another embodiment, it is advisable to effect the color gamut shift step as follows. The color gamut shift step varies the displacement by shift according to any of or combination of hue, chroma, and lightness of the color image data which have not processed at the color gamut shift step. The region where the color gamut of the second image processing device is greater than the color gamut of the first image processing device changes, depending on the hue, lightness, and chroma values.

By changing the displacement by shift for each hue, shift can exactly follow the color gamut change in terms of hue. By changing the displacement by shift for each lightness value, shift can exactly follow the color gamut change in terms of lightness. By changing the displacement by shift for each chroma value, shift can exactly follow the color gamut change in terms of chroma. By gradually changing the displacement by shift, according to the change in hue, lightness, chroma, tone jumps by mapping can be prevented. The color gamut somewhat differs, depending on the image processing media, device type and used ink of the second image processing device, and the image display device. It is also possible to slightly change the displacement by shift for adjusting such difference.

In view of the foregoing, it is advisable to effect the color gamut expansion step as follows. In the color gamut expansion step, the displacement by expansion of the chroma is set up in such a manner that the higher the chroma is which has not processed at the color gamut expansion step, the greater the displacement is. To make tones of images finer for higher chroma available and generate gamut mapping for producing fine tone images, it is necessary to expand the gamut by rising chroma. Significant chroma rise in the low chroma range may cause inherently little colorful colors to become colorful. Thus, the displacements are set such that more expansion will take place in the higher chroma range. In consequence, the resulting gamut mapping enables effective use of the gamut of the second image processing device and production of fine tone images. In further embodiment, it is advisable to effect the color gamut expansion step as follows. In the color gamut expansion step, the chroma expansion is not performed on a certain region where the chroma of the color image data which have not processed at the color gamut expansion step is small. This can prevent gamut expansion from causing inherently little colorful colors to become colorful.

The above-described color expansion shift step is executed for each hue and the color gamut expansion results for all hues must give color values without causing unnatural color appearance as a whole. In view hereof, it is advisable to effect the color gamut expansion step as follows. The color gamut expansion step causes displacement by expansion to vary according to any of or combination of hue, chroma, and lightness of the color image data which have not processed at the color gamut expansion step. The region where the color gamut of the second image processing device is greater than the color gamut of the first image processing device changes, depending on the hue, lightness, and chroma values. By changing the displacement by expansion for the hue, lightness, and chroma values, expansion can exactly follow the color gamut change in terms of hue, lightness, and chroma.

By gradually changing the displacement by expansion, according to the change in hue, lightness, chroma, tone jumps by mapping can be prevented. The color gamut somewhat differs, depending on the image processing media, device type and used ink of the second image processing device, and the image display device. It is also possible to slightly change the displacement by expansion for adjusting such difference. Furthermore, gradually changing the displacement by expansion, according to the change in hue, lightness, chroma can prevent gamut expansion from generating a region out of the color gamut of the second image processing device.

To accommodate different forms of color gamut of an image processing device, it is advisable to perform color transformation as follows. A plurality of color gamuts with different shapes is available to any of or combination of the first image processing device and the second image processing device, and the sets of values represent each relationship of color gamuts. If a plurality of color gamuts of different shapes of an image processing device are available and the same displacements by color gamut shift and color gamut expansion are applied to all gamuts, colors with chroma being over-emphasized or under-emphasized may be produced. For color gamuts, from the viewpoint of color transformation precision as well, it is desirable to perform color transformation using the color data mapping relationships defined for each color gamut.

The color transformation performed based on the color data mapping relationships defined for each color gamut prevents unnatural color transformation for each gamut and enables effective use of each gamut. Diverse circumstances can be supposed where color gamuts of an image processing device are available. For example, it can be said that the color gamut differs, depending on the kind of consumables. For a printer, its color gamut somewhat changes by the replacement of image processing medium and ink set. For a scanner, its color gamut somewhat changes by the change to document type such as translucent one, reflecting one. Moreover, the color gamut somewhat changes when the type of the image processing device changes, and even for the same device type, difference in gamut may occur between individual devices. The foregoing manner can accommodate such difference in color gamut.

To define color data mapping relationships for each color gamut, it is advisable to define the relationship in the color transformation lookup table by individual displacement by shift or/and displacement by expansion to be performed for each of the color gamuts in the device-independent color space. In the present invention, because gamut mapping relationship between the first and second image processing devices is defined by performing the color gamut shift and color gamut expansion steps, by performing these steps for each color gamut, the mapping relationships can be defined for each gamut. For each color gamut, it is not required that completely different methods of gamut mapping be used. Based on the same gamut mapping method, by using different values of its related parameters, different gamut mapping can be produced. However, it is not necessary to assign different values to all parameters for each color gamut and common values of some parameters can be used.

In gamut mapping that varies for each color gamut, it is advisable to effect the color gamut shift step as follows. In the color gamut shift step, the displacement by shift is set up in such a manner that the larger the color gamut of the second image processing device is, the greater the displacement by shift is. A greater color gamut of the second image processing device has a greater region out of the color gamut of the first image processing device. Shifting the gamut of the first image processing device by greater displacement can surely make it close to the gamut of the second image processing device. In consequence, in separate gamut mapping for each color gamut, the region expands where the color gamut of the first image processing device overlaps with that of the second image processing device. This makes it possible to decrease the number of colors that are out of the color gamut of the second image processing device and increase the number of colors available on the second image processing device.

In gamut mapping that varies for each color gamut, it is advisable to effect the color gamut shift step as follows. The color gamut shift step causes displacement in such a manner that if the shapes of the gamuts of the second image processing device differs from each other, the displacement by shift of the highest chroma point in the gamut of the first image processing device is varied. In the mode in which the color gamut shift step modifies gamut mapping in such a manner that the highest chroma point in the color gamut of the first image processing device in a certain hue shifts by the greatest displacement and the displacement by shift of other points decreases in proportion as chroma decreases, change to the displacement by shift of the highest chroma point significantly influences the displacement by shift of the entire color gamut. It can be said that the displacement by shift of the entire color gamut is defined by the displacement by shift of the highest chroma point. In this mode, by changing the displacement by shift of the highest chroma point for each color gamut, different gamut mapping for different gamut shape can easily be obtained.

Not only in the color gamut shift step, gamut mapping that varies for each color gamut can be performed in the color gamut expansion step as well. In the constitution thereof, the displacement by expansion in the color gamut expansion step is set up in such a manner that the larger the color gamut of the second image processing device is, the greater the displacement by expansion is. This manner of expanding the gamut of the first image processing device by greater displacement to a greater color gamut of the second image processing device enables effective use of the color gamut. A greater color gamut of the second image processing device has the wider region where chroma is relatively high. For the greater color gamut, by expanding the gamut of the first image processing device by greater displacement than expanding it to a smaller gamut of the second image processing device, thereby more vivid colors can be produced.

To obtain different gamut mapping for different color gamut shape, a mode is applied in which gamut mapping is adjusted for each color gamut by following the tendency that displacements increase in proportional to the increase in gamut size and this mode is important for an image processing device on which a plurality of color gamuts are available. However, the mode in which the displacements by color gamut shift and color gamut expansion are always set greater for greater gamuts doe not apply to all cases. The following is also possible. For a particular color gamut that belongs to the second image processing device and is smaller than another one of the device, the displacement by shift or/and expansion is set greater than for another one. In other words, when performing color gamut shift or/and expansion, it is possible to set displacements conflicting with the tendency that displacements increase in proportional to increase in gamut size.

In this way, it is possible to make color images uniform in impression when produced after color transformation.

As the result of color transformation of the present invention, color appearance of images output by the second image processing device is important. After color transformation is executed, the color appearance of images output by the second image processing device is visually checked and then final tuning may be required. Tuning in conflict with the tendency that displacements increase in proportional to the increase in gamut size is allowable. For example, if kinds of image processing media and ink sets can be used on a printer, the printer has color gamuts for each combination of image processing medium and ink set. Even if unnatural color transformation prevention and effective use of color gamut are achieved separately for each color gamut, change of image processing media and/or ink set may cause the printer to output color images that are different in color impression as compared with those produced before the change and the user may want to prevent such difference.

In such cases, the color appearance of an image produced with each combination of image processing medium and ink set may differ, depending on the relativity of one color to its surrounding color. If color gamut shift and expansion are executed straightforwardly with the displacements set in accordance with the tendency that displacements increase in proportional to the increase in gamut size, print results of the same image may look different in color impression. When uniform color impression even with color gamuts is reckoned important, tuning is performed, and the set displacements by color gamut shift and expansion may be in conflict with the above tendency for some color gamuts. Such tuning is preferable if uniform print results even with color gamuts are reckoned important and allowable in the present invention.

For color transformation purposes, not only the color gamut shift step and color gamut expansion step of the present invention, but also other steps may be taken from different viewpoints. Often, as the result of execution of the combination of the steps, the relationship between the color gamuts of the first image processing device and the second image processing device is defined. When the above relationship is defined as the result of processing including other steps, it may be preferable to set the displacements by color gamut shift and expansion in conflict with the tendency that displacements increase in proportional to the increase in gamut size to eventually obtain fine color appearance. Accordingly, such tuning is allowable.

In color transformation that is executed, based on color data mapping relationships defined for a plurality of color gamuts, it is advisable to obtain another lookup table as follows. The relationship of gamuts is obtained by correcting the sets of values which are stored in a certain storage area and represent a relationship of the gamut. This renders it unnecessary to store the respective lookup tables which represent the predefined relationships of all pairs of gamuts. Thus only a minimum number of lookup tables are required for storing such relationship with regard to a particular color gamut of the second image processing device, saving storage area. For the correction method, any of diverse methods can be adopted. For example, one method is as follows. The shape of a particular color gamut of the second image processing device and the tendency of change of mapping relationship relative to that shape, estimated in advance, are maintained. By comparison between the shape of any color gamut of the second image processing device and the above color gamut shape, how the color gamut has changed is determined, based on which the mapping relationship is corrected. Another method is as follows. By comparing the reference mapping relationship with regard to a particular color gamut of the second image processing device and that for another gamut thereof, only color data of difference is maintained. During the processing for color transformation, color data of difference from the reference mapping relationship about the particular color gamut is replaced.

To practice color transformation of the present invention, it is preferable that the user can choose whether to execute the color transformation. It is also advisable to take the following manner. The sets of values which represent the relationship with the application of color gamut shift or/and color gamut expansion and the relationship without the application of color gamut shift or/and color gamut expansion, are made and stored in a certain storage area; and the relationship is decided based on the mode which is selected in advance by a user.

In this manner, the user can choose whether to execute color transformation based on the mapping relationship defined by the execution of color gamut shift or/and color gamut expansion in accordance with the present invention or execute color transformation based on the mapping relationship in other way. Color transformation execution according to the mapping relationship defined by the execution of color gamut shift or/and color gamut expansion of the present invention is advantageous in that vivid color appearance is obtained and unnatural color transformation can be prevented. However, to meet the user's need that may differ, according to circumstances, it is preferable to provide options including the color transformation in accordance with the present invention. For example, some users may make a fine adjustment of colors on the first image processing device and want exactly the same colors output from the second image processing device. For such users, it is difficult to output a color image to the user's intention if the color transformation in accordance with the present invention is performed. Thus, it is convenient for such users that color transformation can be performed, based on the mapping relationship defined without the execution of color gamut shift and color gamut expansion of the present invention. This serves the user's need that may differ.

Herein, color transformation lookup tables are prepared to maintain any or combination of the mapping relationship defined by executing the color gamut shift step, the mapping relationship defined by executing the color gamut expansion step, the mapping relationship defined by executing the color gamut shift step, and the color gamut expansion step; and to maintain the mapping relationship defined by without executing these steps. The mapping relationship defined by without executing these steps includes all mapping relationships not modified by color gamut shift and color gamut expansion. When executing color transformation, it is advisable that the mapping relationship to be selected can be specified by mode selected by the user beforehand.

For example, explicit modes such as color gamut shift mode, color gamut expansion mode, color gamut shift and expansion mode, and other mode may be applied.

Alternatively, non-explicit modes such as vivid mode, moderate mode may be applied. Selecting a mode beforehand may be done at least before color transformation. As means for facilitating mode selection, any of diverse means may be taken; for example, default selection that may be set and reset at any time, a mode selection dialog box presented before color transformation.

Even if the above-described color gamut shift step and said color gamut expansion step are executed, hue variation can be limited to a small degree; for example, it can be restricted to 15 degrees or less in Lab space.

The above-described color transformation lookup table is used for printing after color transformation and the same color gamut shift step and color gamut expansion step can be employed in a printing apparatus. Conceivably, such apparatus may be put into operation in a stand-alone mode or integrated into some equipment or system and put into operation with another methodology. Not limited to a certain mode of operation, the concept of the invention comprehends a variety of modes in which the invention is embodied and appropriate modifications are permissible within the range of the invention.

The above-described color gamut shift step and color gamut expansion step can be implemented as part of a printing method.

These steps can be executed by a computer. In such cases, the color gamut shift and color gamut expansion steps are embodied in program code of a printing program that is stored on a medium. The medium may be a magnetic recording medium, a magneto-optic recording medium, or any other recording medium which will be developed in future, all of which can be considered applicable to the present invention in all the same way. Embodiment of the present invention as software and hardware combination makes no difference in the concept of the invention. Embodiment of the present invention includes such a manner that part thereof is recorded on a medium in advance and will be read appropriately as required. Furthermore, duplicates of the above medium as primary and secondary duplicate products and the like are considered equivalent to the medium without doubt.

According to the above-described steps in accordance with the present invention, color transformation lookup tables can be created before or when color transformation is executed. In view hereof, the present invention can be interpreted as a method of creating color transformation lookup tables.

BRIEF DESCRIPTION OF THE DRAWINGS

FIG. 20 shows a table listing symbolic values of parameters depending on color gamuts for each combination of ink set and image processing medium.

FIG. 28 shows another table listing symbolic values of parameters depending on color gamuts for each combination of ink set and image processing medium.

DETAILED DESCRIPTION OF THE PREFERRED EMBODIMENTS

This section describes preferred embodiments of the present invention in the following aspects which will be described in order:

| | |
|---|---|
| (1) | Configuration for implementing the present invention |
| (2) | Print operation |
| (3) | LUT creation process |
| (4) | Color gamut shift |
| (5) | Color gamut expansion |
| (6) | Preferred Embodiment 2 |
| (7) | Preferred Embodiment 3 |
| (8) | Preferred Embodiment 4 |
| (9) | Preferred Embodiment 5 |
| (10) | Preferred Embodiment 6 |

(1) Configuration for Implementing the Present Invention

Figure 1:
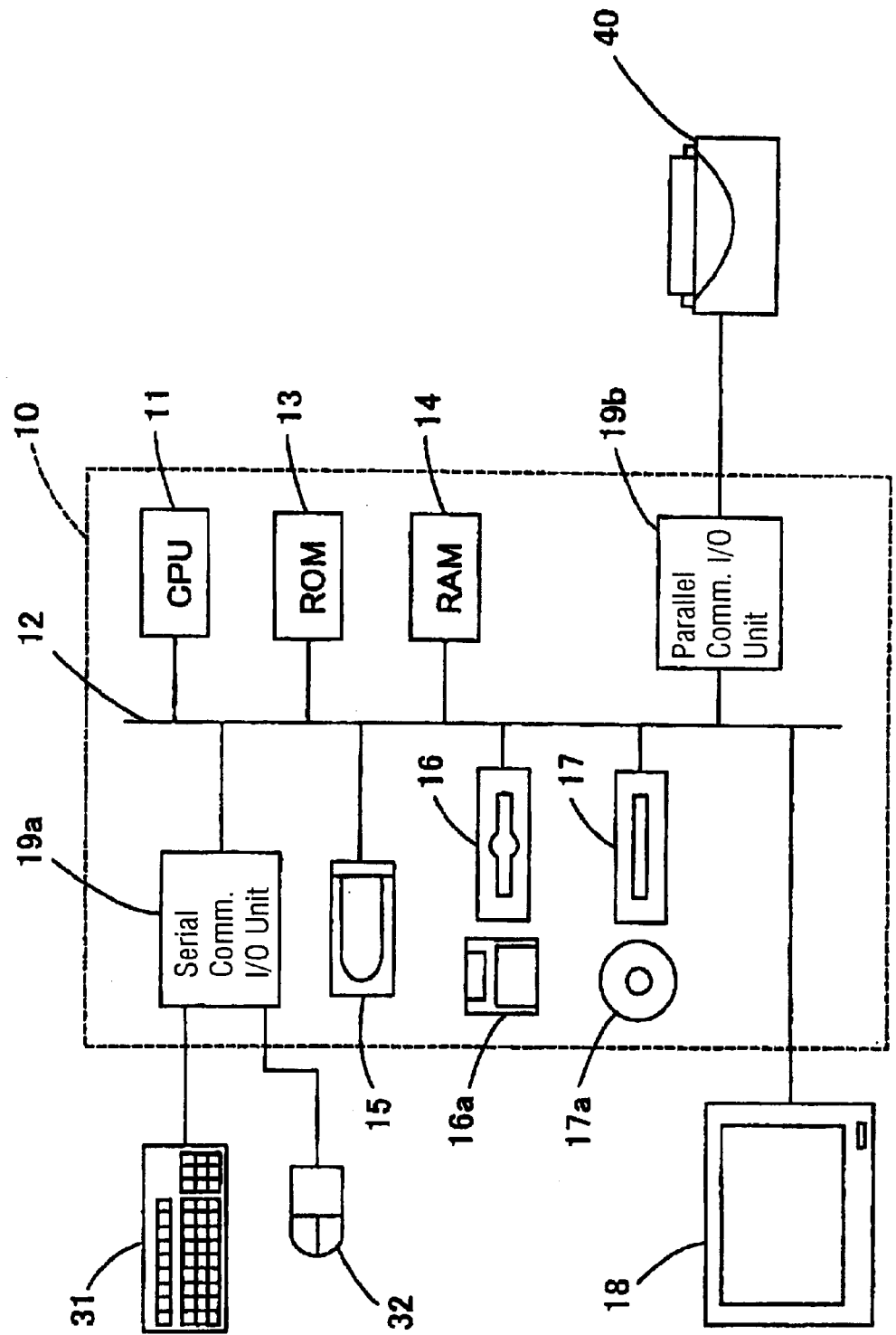
FIG. 1 is a block diagram showing the simplified hardware structure of a computer that executes a color transformation program for performing color transformation using a color transformation lookup table provided in accordance with one preferred embodiment of the present invention.
Figure 2:
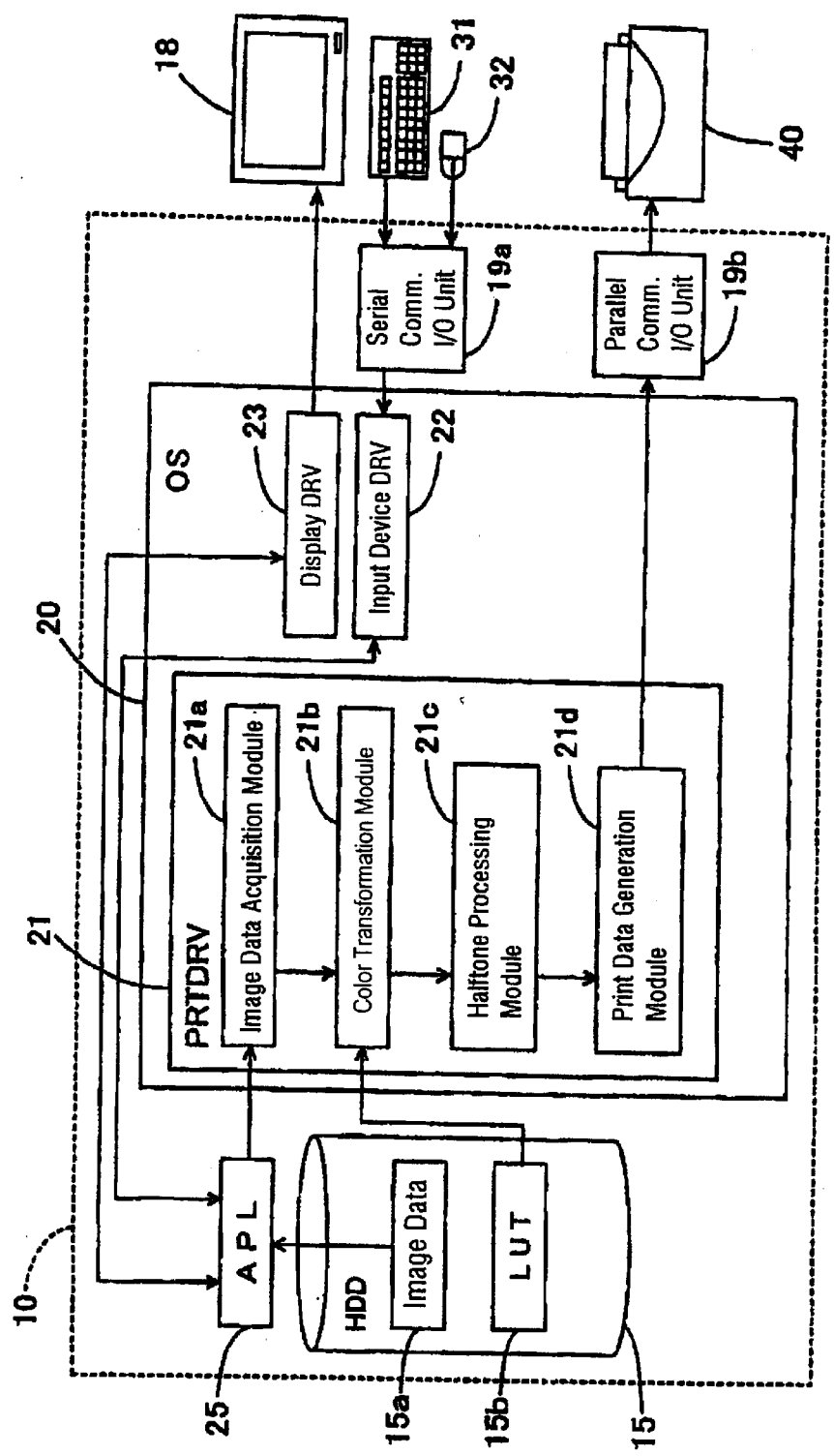
FIG. 2 is a block diagram showing the simplified structure of the OS and related components in the computer wherein the color transformation program is provided as a color transformation module.

FIG. 1 shows the simplified hardware structure of a computer that executes a color transformation program provided in accordance with the present invention. FIG. 2 shows the simplified structure of the OS and related components in the computer wherein the color transformation program is provided as a color transformation module 21b of a printer driver which is incorporated in the OS. CPU 11 of the computer 10 is the center of arithmetic processing and can gain access over a system bus 12 to ROM 13 and RAM 14 in which BIOS or the like has been stored.

To the system bus 12, a hard disk drive (HDD) 15, floppy disk drive 16, and CD-ROM drive 17 which are configured as external storage devices are also connected. The OS 20, application program (APL) 25, and the like stored in the disk on the HDD 15 are transferred to the RAM 14 and the CPU 11 properly accesses the ROM 13 and the RAM 14 and executes the software. In other words, the CPU executes kinds of programs by using the RAM 14 as a temporary working area.

To a serial communication I/O unit 19a, input devices for user operation such as a keyboard 31 and mouse 32 are connected and a display 18 for visual presentation is also connected via a video board which is not shown. Connection to a printer 40 can be made via a parallel communication I/O unit 19b. As the computer 10 whose simplified structure is now explained, a generally configured personal computer can be used. Of course, computers applicable to the present invention are not limited to personal computers. Although a so-called desktop-type computer is assumed to be used in the present preferred embodiment, a notebook-size computer, and a computer with mobile features may be used. Besides, the connection interface between the computer 10 and the printer 40 is not limited to the above-mentioned one. Any can be adopted from diverse modes of connection such as serial interface, SCSI, USB including any connection mode that will be developed in future.

Although a suite of programs is stored in the disk on the HDD 15 in the present embodiment, the storage medium is not limited to the hard disk. Other storage media, for example, a floppy disk 16a and a CD-ROM 17a may be used. The programs stored in these storage media are read via the floppy disk drive 16 and CD-ROM drive 17, transferred into the computer 10, and installed in the disk on the HDD 15a. Then, the programs are read via the HDD 15 into the RAM 14 and run for computer control. In addition to the above-mentioned storage media, a magneto-optic disk or the like may also be used. As a semiconductor device, a non-volatile memory or the like such as a flash card can be used. Alternatively, the programs can be downloaded by accessing an external file server via a modem and over a communication network; in this case, the communication network is a transmission medium by which the present invention is embodied for use.

On the computer 10 configured in accordance with the present preferred embodiment, the OS 20 is installed in which a printer driver (PRTDRV) 21, an input device driver (DRV) 22, and a display driver (DRV) 23 are incorporated as shown in FIG. 2. The display DRV 23 is a driver for controlling the operation of displaying images from image data and other presentations on the display 18. The input device DRV 22 is a driver for receiving code signals input from the above-mentioned keyboard 31 and mouse 32 via the serial communication I/O unit 19a and receiving user input.

APL 25 is an application program by which retouching a color image and other image processing can be executed and allows the user to print the color image with the printer 40 by operating the above-mentioned input devices for user operation under the run of the APL 25. For this print operation, the PRTDRV 21 is called. Under the control of the PRTDRV, image data expressing colors in the color gamut of the display 18 is acquired and color transformation is executed so that certain colors that are out of the color gamut of the display 18, but fall within the color gamut of the printer 40 will be available in printing. In consequence, fine tone color images can be printed free from the constraint of the color gamut of the display 18. For this purpose, the PRTDRV 21 comprises the above-mentioned color transformation module 21b and besides an image data acquisition module 21a, a halftone processing module 21c, and a print data generation module 21d.

The APL 25 makes the computer read image data 15a stored in the disk on the HDD15 into the RAM 14, then retouching and other processing can be performed for the image data. The display DRV23 makes the computer present an image on the display 18, based on the image data 15a read into the RAM 14. When the user performs input by operating the above-mentioned input devices, the APL 25 receives the user input through the input device DRV 22, interprets it, and instructs the computer to execute print operation, retouching, or other processing, according to the user input.

The image data 15a in the present preferred embodiment is dot-matrix data in which colors are expressed in tones of RGB (read, green, and blue) components in compliance with the sRGB standards. A lookup table (LUT) 15b, which will be explained later, may be built to contain data generated in such a manner as to transform the RGB-based data specific to the display 18 into CMYK based data. By altering the LUT 15a as required, it is possible to easily adapt the LUT 15b to another device of display 18 and printer 40 and change of image processing medium or the like used on the printer 40.

When the APL 25 receives an input of request for executing print operation in the way described above, the image data 15a is acquired under the control of the image data acquisition module 21a and the image data acquisition module 21a activates the color transformation module 21b. The color transformation module 21b is run for transforming RGB tone values into CMYK tone values, and under its control, all dots of the image data 15a are transformed into CMYK-based dots. During this transformation, the color transformation module 21b makes the computer execute interpolation computation while referring to the LUT 15b stored in the disk on the HDD 15. Because the LUT 15b contains data generated through the processing of color gamut shift and color gamut expansion which will be explained later, color data that is out of the color gamut of the display 18, but falls within that of the printer 40 can be generated during this color transformation process.

The CMYK tone data generated by color transformation under the control of the color transformation module 21b is handed over to the halftone processing module 21c. The halftone processing module 21c is intended for halftone processing in which CMYK tone values of all dots are transformed into values in the density of the corresponding color inks. In this processing, data for driving the print head to deposit the inks on paper, according to the values of density obtained after transformation is generated. The print data generation module 21d receives such data for driving the print head, and under its control, the data is arranged in sequence in which the data is to be used on the printer 40. On the printer 40, an array of ink jet nozzles, not shown, is installed as an ink jet device. In this nozzle array, because a plurality of ink jet nozzles are installed in parallel in the feed direction, data for dots that are separated by a few dots in the feed direction is used simultaneously.

Then, rasterizing is performed, that is, rearranging the data in sequence so that dots data arranged in the scanning direction that are to be used simultaneously will be buffered simultaneously in the printer 40. After the rasterizing, predetermined data such as image resolution is added, and print data is generated that is output to the printer 40 via the parallel communication I/O unit 19b. Based on the print data, the printer 40 prints an image displayed on the display 18.

(2) Print Operation

Print operation to be carried out by the hardware and software configured as above will be explained below, based on a flowchart shown in FIG. 3 and a conceptual diagram of operation shown in FIG. 4. On the screen of the display 18 shown in FIG. 4, an image is displayed under the run of the APL 25; that is, image data 15a stored in the disk on the HDD 15 is read into the RAM and an image therefrom is displayed on the screen, when the computer is receiving user request for executing print operation. In short, under the APL 25, when the image data 15a is read into the RAM 14, image A is presented on the display 18 from the image data 15a under the control of the display DRV 23.

Figure 4:
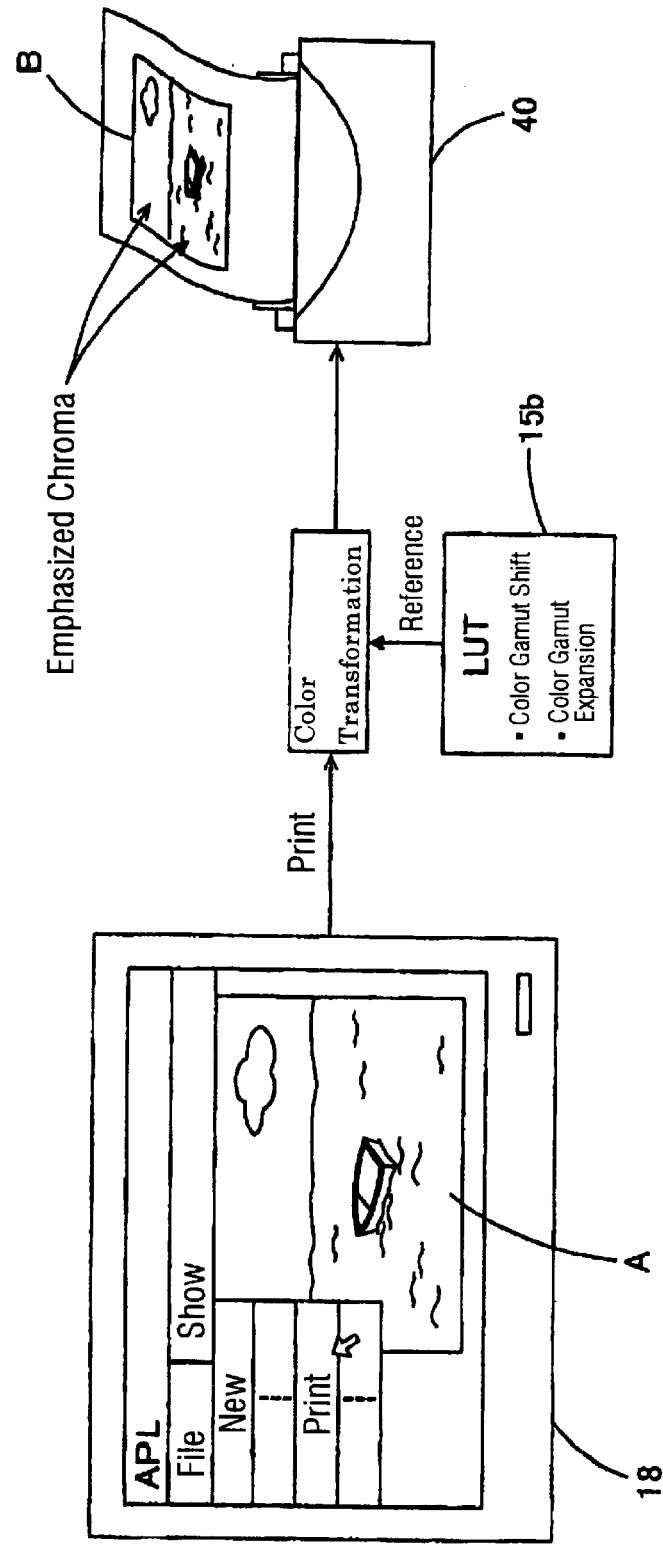
FIG. 4 is a conceptual diagram of operation of the present invention.

Image A shown in FIG. 4 is a photograph of a scene of the sea and blue sky above, which is captured with a digital camera, not shown, as an image that is colored in a lot of colors of tints in the green hue to the blue hue. Because the LUT 15b in the present preferred embodiment is built to make effective use of colors such as the colors of tints in the green hue to the blue hue, which are out of the color gamut of the display 18, but fall within the color gamut of the printer 40, as will be explained later, an image assuming the hues like image A is suitable for the one to which the present invention should be applied. Under the APL 25, the computer reads the data of image A stored in the disk on the HDD 15 into the RAM and presents image A on the display 18. Then, the user can request the computer to execute retouching and other image processing as well as print operation of the image A via the APL.

Request for retouching and print operation can be performed by choosing the appropriate item from the menu presented on the display 18, using the input device such as the mouse 32. On the illustrative screen shown in FIG. 4, the user is issuing the request for executing print operation by using the pointer of the mouse 32. More specifically, using the mouse 32, when the user points the Print item from the menu by the pointer and clicks it with the button of the mouse 32, the request for executing print operation is issued and the image data 15a is handed over to the PRTDRV 21.

Figure 3:
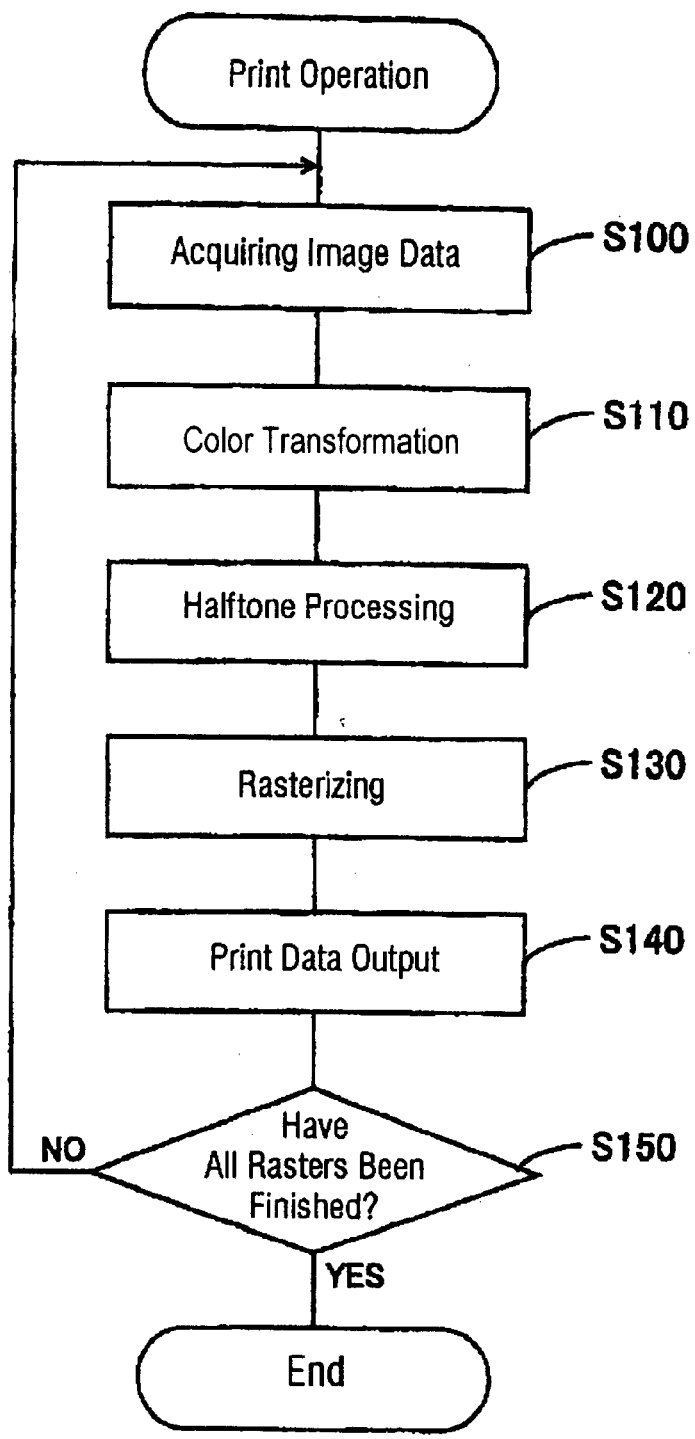
FIG. 3 is a flowchart illustrating print operation.

Once the image data 15a has been handed over to the PRTDRV 21, print operation illustrated in FIG. 3 starts. In step S100, image data 15a of image A is acquired from the RAM 14, where it was stored, under the control the image data acquisition module 21a. Then, the color transformation module 21b is activated and the RGB to CMYK transformation for all dots of the image data 15a is executed in step S110. During this transformation, the color transformation module 21b makes the computer execute interpolation computation while referring to the LUT 15b, thereby generating CMYK data. The LUT 15b contains data created through color gamut shift by which the color gamut of the display 18 is made close to that of the printer 24 in the region of the green hue to the blue hue of low and medium lightness and color gamut expansion by which the extent of chroma values expands while the lightness keeps virtually constant. The LUT 15a is built to map a given color in the gamut of the display 18 to a color of its transformation with higher chroma that is invisible on the display 18. Thus, color transformation can be performed so that the tones of image A can be refined by the effective use of the color gamut of the printer 40 free from the constraint of the color gamut of the display 18.

After the color transformation, the dot matrix data obtained is subjected to halftone processing in step S120 under the control of the halftone processing module 21c. Furthermore, the data is subjected to rasterizing in step S130 under the control of the print data generation module 21d. Then, the thus generated print data is output to the printer in step S140 via the parallel communication I/O unit 19b. In step S150, judgment is made as to whether all rasters of the image data 15a have been processed by color transformation and subsequent. Until it has been judged that all rasters have been processed, the steps 100 and subsequent steps are repeated. As the result, the printer 40 prints image B, using the colors obtained after the color transformation. The sky and sea view of image B is printed with emphasized chroma in the region of the green hue to the blue hue of low and medium lightness as compared with image A.

Figure 5:
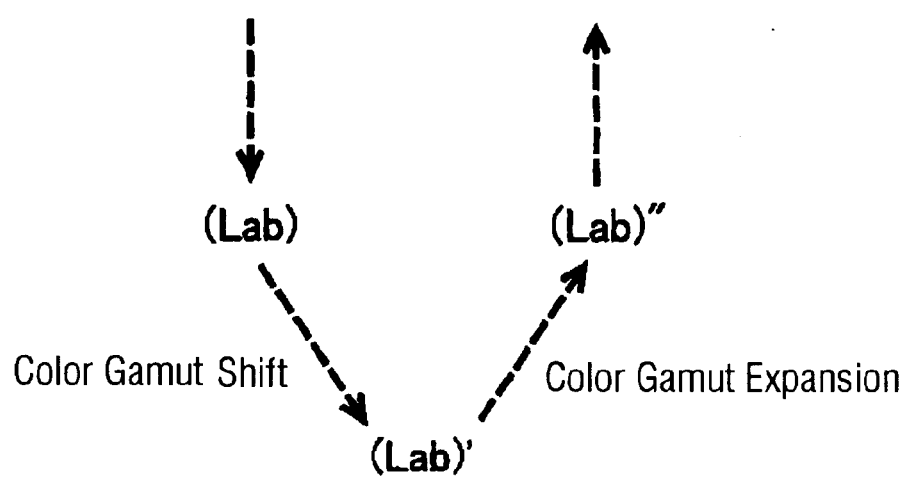
FIG. 5 shows an exemplary lookup table (LUT).

The LUT 15b contains, as is shown in FIG. 5, RGB tone data in compliance with the sRGB standards and corresponding CMYK tone data for use on the printer 40 for sample points. In the step S110, the interpolation computation is executed, based on these sample points, thereby mapping any given RGB tone values to CMYK tone values. As the method of interpolation computation, diverse techniques are publicly known and any of them is applicable. In accordance with the present invention, the LUT 15b is created through the processing of color gamut shift and color gamut expansion. Thus, the expansion of the extent of chroma values can be achieved as described above by making effective use of the color gamut of the printer 40 and unnatural color transformation does not take place. Next, a process of creating the LUT 15b will be explained.

(3) LUT Creation Process

Figure 6:
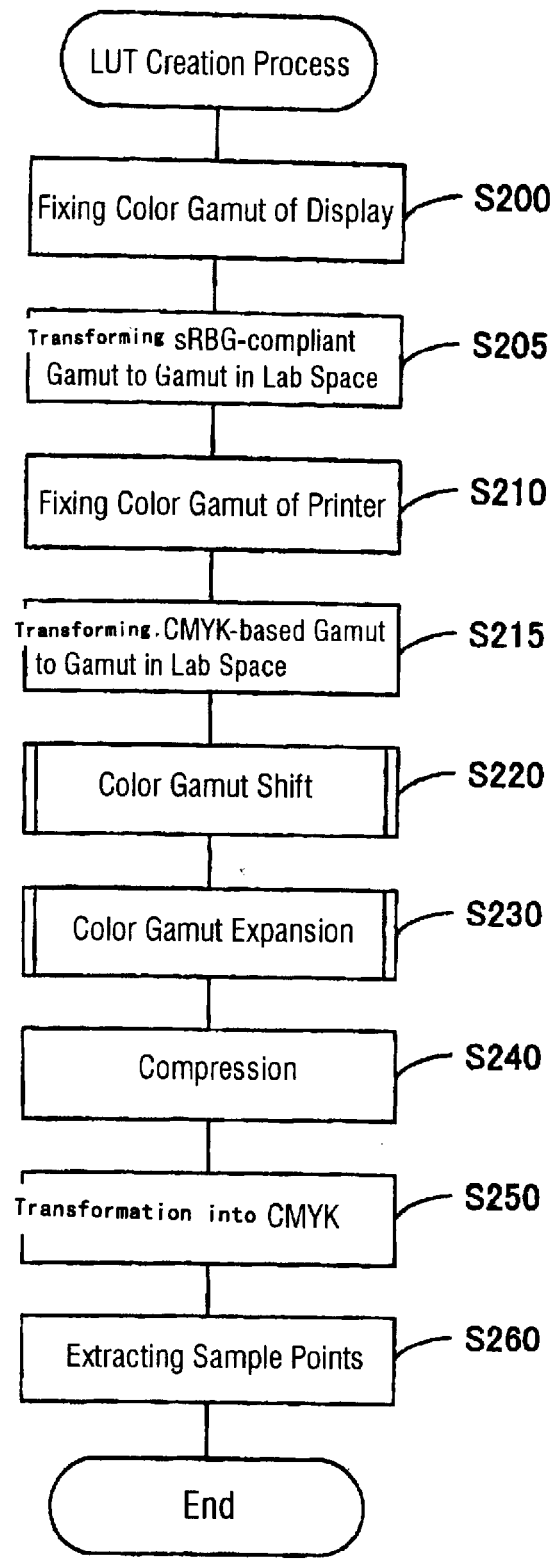
FIG. 6 is a flowchart illustrating the process of creating the LUT.

FIG. 6 illustrates the process flow of creating the LUT 15b. Because this process involves a lot of arithmetic processing, using the computer is desirable to execute arithmetic operation. The processing of color gamut shift and color gamut expansion in accordance with the present invention is performed in such a manner as to alter the lightness and chroma without actively changing the hues in a hue. On the assumption of using a Lab (CIELAB) color space, this processing is performed on a plane intersecting axis L at right angles and in parallel displacement along the axis L in the Lab space. The processing is performed for a region of a certain hue range in which a color region exists that is out of the color gamut of the display 18, but falls within the color gamut of the printer 40. In the present preferred embodiment, the region of the green hue to blue hue applies as described above. Specifically, this region is defined as the range of hue angles 120° to 280° in the Lab space in which the above processing in accordance with the present invention can be performed for the colors of tints in the green hue to the blue hue. This region of target of processing can be changed, according to the applied device type of display and printer, the image processing medium used, and the kinds of ink or other colorant used on the printer.

Although the LUT 15*b* is to hold the mapping between RGB values and CMYK values, the processing is performed in the Lab space, which is device-independent color space, to take the color gamut of the display 18 and the color gamut of the printer 40 into account. Instep S200, first, the color gamut of the display is fixed. In the present preferred embodiment, in the image data 15*a*, colors are expressed by combinations of the respective 256 tone values of the R, G, and B colors. The color gamut of the display 18 is fixed by taking all combinations of the respective 256 tone values of R, G, and B into account. Because the RGB data is image data in compliance with the sRGB standards as described above, it can be transformed into color values by the coordinates of the Lab space by using a publicly known transformation formula. In step S205, this transformation is performed and the color gamut of the display 18 in the Lab space is fixed.

In step S210, the color gamut of the printer 40 is fixed. In the CMYK tone data for the printer 40, similarly, colors are expressed by combinations of the respective 256 tone values of the C, M, Y, and K colors. Thus, the color gamut of the printer 40 is fixed by taking all combinations of the respective 256 tone values of C, M, Y, and K into account. In step S 215, the thus fixed color gamut is transformed into the gamut in the Lab space. Hereon, the printer's color gamut in the Lab space can be fixed by measuring a color patch printed from the above CMYK data with a calorimeter or by reference to the profile of the printer 40. Not only the CMYK tone data, but also CMY data, CMYKlclm data, and CMYK lclmDY data may be applied. It is also possible to fix the printer's color gamut in the Lab space, based on the transformation by means of color separation into color components, using the above-mentioned color data in combination.

After thus fixing the color gamut of display 18 and the color gamut of printer 19 in the Lab space, color gamut shift is executed in step S220 to shift and map the color gamut of display 18. Furthermore, color gamut expansion is executed in step S230 to expand and map the thus shifted gamut. Hereon, the above color gamut shift is executed to decrease the lightness and increase the chroma. The resulting gamut mapping is expanded such that the shape of the color gamut of display 18 is close to that of printer 40. Thus, the resulting gamut maintains the characteristics of the color gamut of display 18, while it is close to the characteristics of the color gamut of printer 40. Moreover, as compared with the gamut of display before being shifted, the number of colors falling within the color gamut of printer 40 has increased and the number of colors out of the color gamut of printer 40 has decreased. The color gamut expansion is executed to increase the chroma, thus producing gamut mapping such that the gamut once shifted further expands into the color gamut of printer 40. Thus, the resulting gamut is characterized by the increased number of colors with higher chroma out of the color gamut of display 18.

In step S240, color values by the coordinates that are still out of the color gamut of printer 40 after the gamut mapping and modification are compressed toward the center point of lightness. Because the thus produced gamut dot-to-dot corresponds to the original color gamut of display 18, the color data in the resulting gamut is transformed into the CMYK tone values in step S250. Hereon, this transformation is reverse to the transformation performed in the step S215. As the result of this transformation, mapping between the sRGB-compliant data and the CMYK data is set definite. In step S260, the sample points necessary for interpolation computation at color transformation are extracted and their data is set in the LUT 15*b*.

The LUT 15*b* is thus built as exemplified in FIG. 5. Apparently, the table contains data representing simple mapping between the sRGB data and the corresponding CMYK data, but this mapping has been obtained through the transition indicated by the dotted lines and arrows below the table. Specifically, the shift of the color gamut of display 18 in the Lab space produces gamut mapping (Lab)' and expanding the gamut (Lab)' produces gamut mapping (Lab) ". Finally, the sRGB color data in the resulting gamut (Lab)" is transformed into the CMYK data. After color transformation executed by the color transformation module 21*b*, consequently, such colors are reproduced from the CMYK data that are not reproducible from the sRGB data. Note that the LUT 15*b* can be adapted to varieties of devices of display 18 and printer 40, image processing media, and ink used on the printer 40.

(4) Color Gamut Shift

Figure 7:
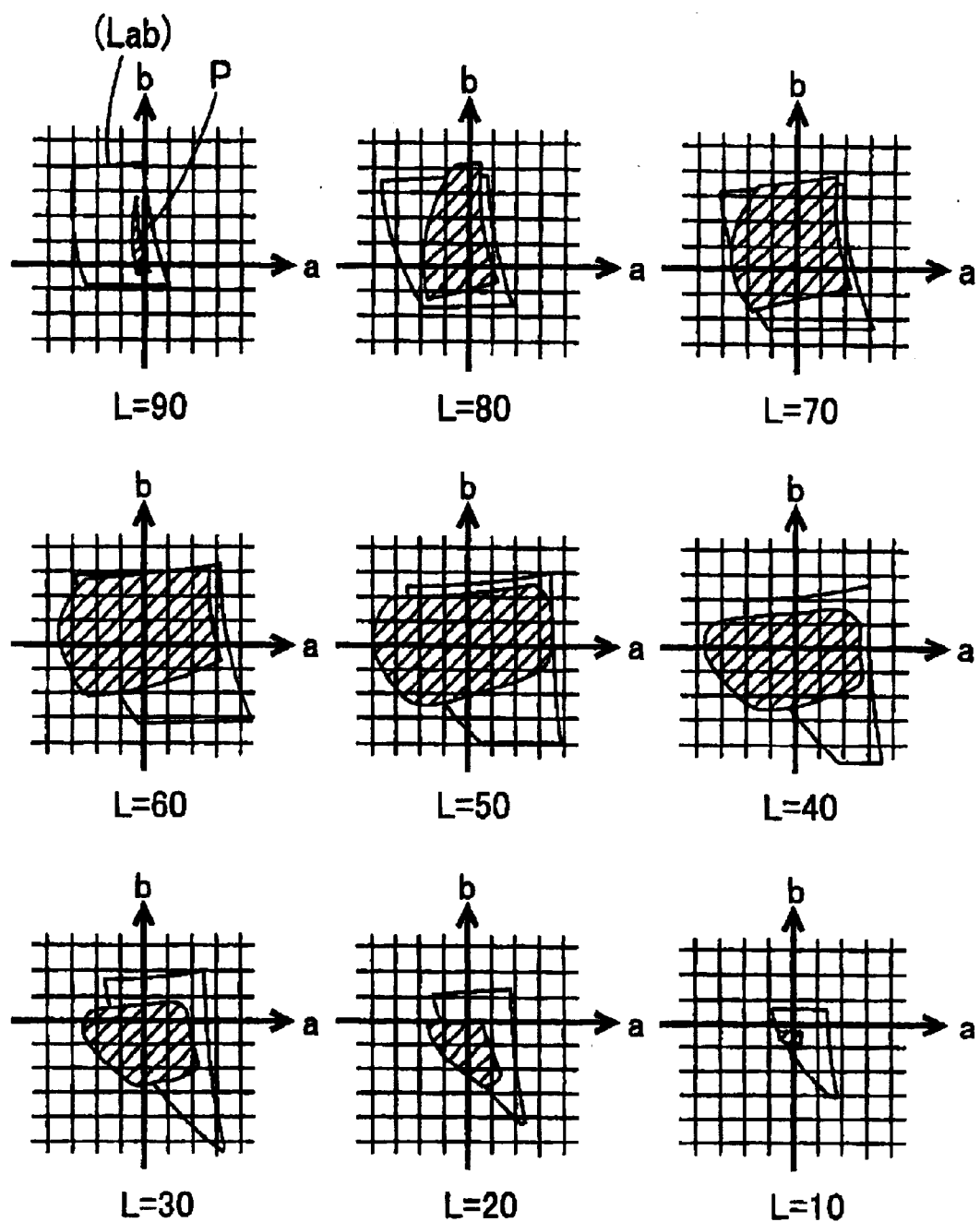
FIG. 7 shows surface views of color gamut forms on the a-b plane cut in lightness segments in the Lab space.

In this subsection, the color gamut shift in the above-mentioned step S220 will be explained in detail. FIG. 7 shows surface views of the color gamut (Lab) of display 18 and the color gamut P of printer 40 on the a-b plane cut in lightness segments in the Lab space. Here, the range of lightness L values "$10 \leq L \leq 90$" is segmented in steps of 10. As shown in FIG. 7, in the high lightness range (L is 70 or higher), the color gamut (Lab) of display 18 is generally wider than the color gamut P of printer 40. In the medium lightness range (30<L<60) and in the region of the green hue to the blue hue (hue angles of 180°±90°), however, the color gamut P of printer 40 is wider than the color gamut (Lab) of display 18. Thus, the processing of color gamut shift and color gamut expansion is performed for the region around the hue angle of 180°.

Figure 8:
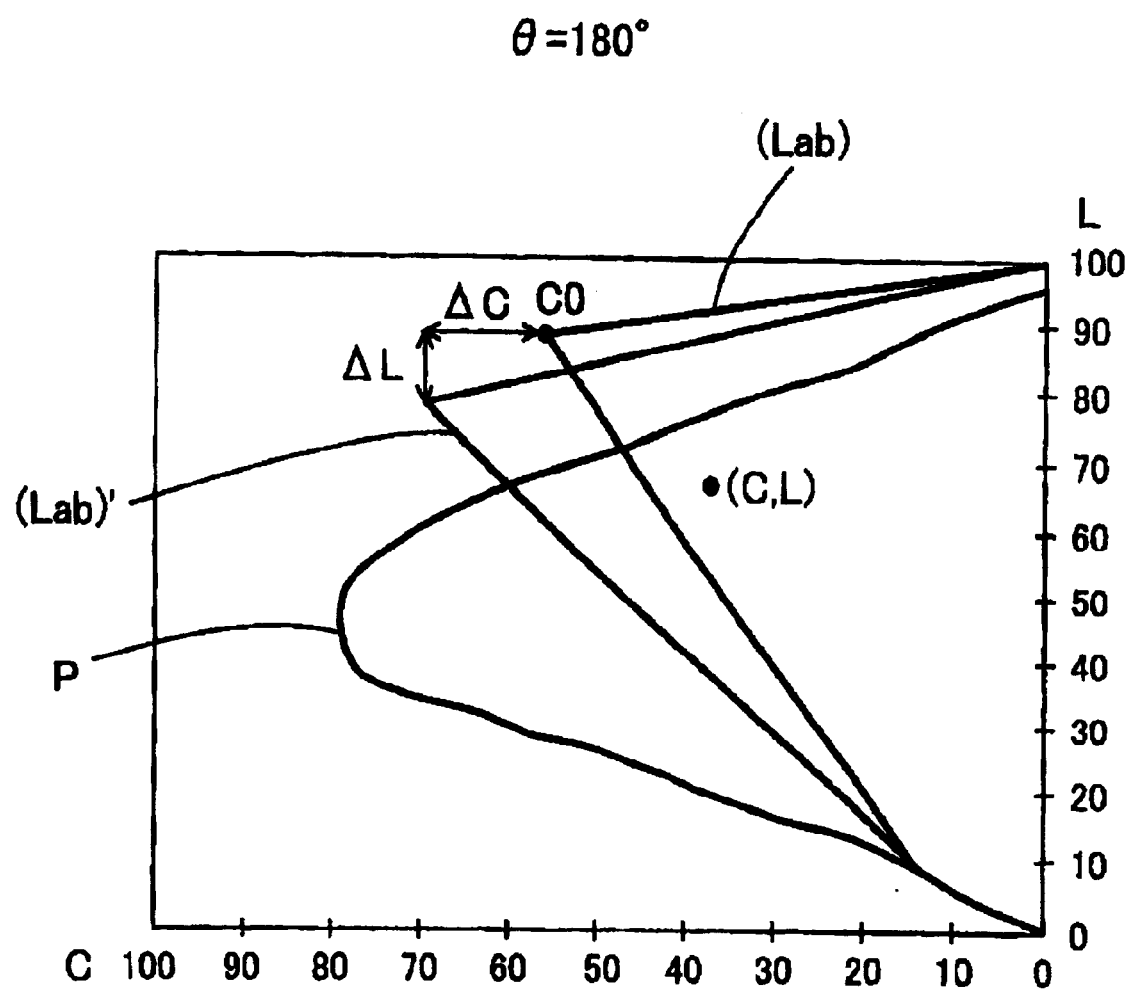
FIG. 8 shows mapping of color gamut forms on the L (lightness) and C (chroma) coordinates plane cut in the Lab space.

FIG. 8 shows mapping of the color gamut (Lab) of display 18, the color gamut P of printer 40, and the gamut (Lab)' shifted by color gamut shift on the plane cut at the hue angle of 180° in the Lab space. Here, chroma C (=(a2+b2)(½)) is plotted on the abscissa and lightness L is plotted on the ordinate, ranging "$0 \leq C \leq 100$" and "$0 \leq L \leq 100$," respectively. In the present preferred embodiment, color gamut shift is executed so that the highest chroma point of the color gamut (Lab) of display 18** will shift the most in chroma and lightness. The shifts of other color values by the coordinates (C, L) are determined by how near is the value of the chroma coordinate to the highest chroma point.

For a given point in the gamut (Lab), values of its coordinates (Cnew, Lnew) to where to shift are calculated by using the following equations (1) and (2):

[Equation 1]

$$Cnew = C + \Delta C \frac{C}{C0(\theta)} RC(\theta) \quad (1)$$

$$Lnew = L + \Delta L \frac{C}{C0(\theta)} RL(\theta) \quad (2)$$

where, the values of the coordinates of a given point from where to shift are (C, L), the displacement of the highest chroma point in chroma is ΔC and that in lightness is ΔL, and the highest chroma point is chroma C0 (θ) at hue angle θ. In the present preferred embodiment, the highest chroma point lies at the hue angle of 180°. The displacements ΔC and ΔL in FIG. 8 can be selected suitably, according to the applied device type of display 18 and printer 40 and other conditions.

Figure 9:
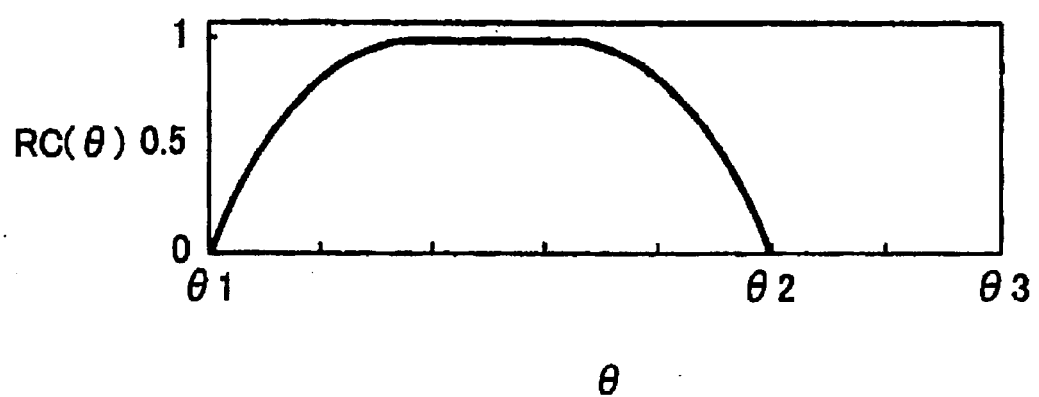
FIG. 9 shows how a shift coefficient in chroma varies, depending on hue angles.

In these equations (1) and (2), RC (θ) is a shift coefficient in chroma and RL (θ) is a shift coefficient in lightness and these shift coefficients vary, depending on the hue angles. The shift coefficient in chroma RC (θ) assumes a finite value that varies within the range of "θ1≦θ≦θ2" (θ1 and θ2 are equal angles from 180°) as is shown in FIG. 9. As the hue angle increases from θ1, the shift coefficient gradually rises from 0 to 1. As the hue angle decreases from θ2, the shift coefficient gradually rises from 0 to 1. In a given range of hue angles between θ1 and θ2, the shift coefficient keeps at 1.

Figure 10:
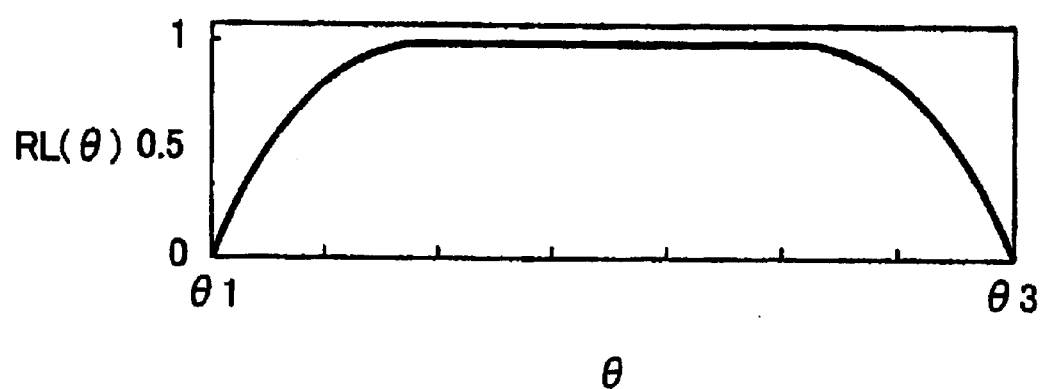
FIG. 10 shows how a shift coefficient in lightness varies, depending on hue angles.

The shift coefficient in lightness RL (θ) assumes a finite value that varies within the range of "θ1≦θ≦θ3" (θ1 and θ3 are equal angles from 180°) as is shown in FIG. 10. As the hue angle increases from θ1, the shift coefficient gradually rises from 0 to 1. As the hue angle decreases from θ3, the shift coefficient gradually rises from 0 to 1. In a given range of hue angles between θ1 and θ3, the shift coefficient keeps at 1. The dependence of the shift coefficients in chroma RC (θ) and lightness RL (θ) on the hue angles is attributed to the projection of the color gamut P of printer 40 toward the left, that is, in the direction of the hue angle of 180° in the medium lightness range as shown in FIG. 7. This takes account of the geometrical relation between the color gamut P of this shape and the color gamut (Lab). The shift coefficients in chroma RC (θ) and lightness RL (θ) vary, depending on the hue angles, but they do differently. As a result, the color gamut (Lab) of display 18 will be finely adjusted to be close to the color gamut P of printer 40.

In the above equations (1) and (2), the displacement of the highest chroma point in chroma ΔC or in lightness ΔL is multiplied by a ratio of the chroma coordinate C of a given point from where to shift to chroma C0 (θ) at the highest chroma point. If the coordinates of a point from where to shift are nearer to the edge of the color gamut (Lab) of display 18, the shift in chroma and lightness is greater. The lower the chroma, the shift will be smaller. In other words, for a color of little colorfulness, located near the lightness axis, there will occur a little shift in chroma and lightness.

Figure 11:
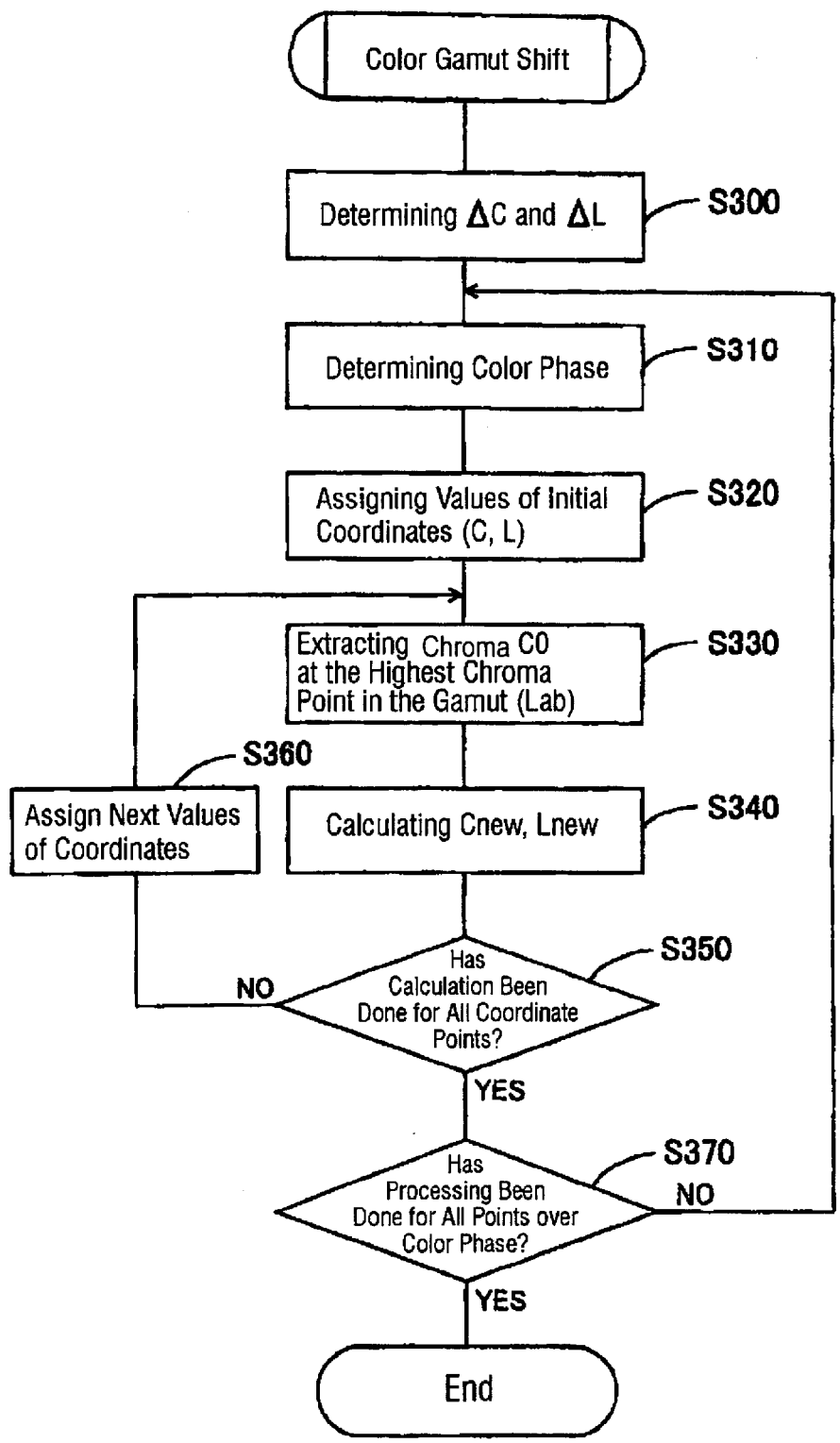
FIG. 11 is a flowchart illustrating color gamut shift processing.

FIG. 11 is a flowchart illustrating the processing of color gamut shift using the above equations (1) and (2). Referring to FIG. 11, at the first step S300, the highest chroma point displacements ΔC in chroma and ΔL in lightness in the color gamut (Lab) of display 19 are determined. In the next step S310, a hue for which the shift processing is carried out is determined. In the present preferred embodiment, the hue range of "θ1 to θ3" is set as the target of processing, and in this range, the shift coefficients in chroma RC (θ) and lightness RL (θ) varies, depending on the hue angles. The shift processing is carried out, while changing the hue angle in steps of a predetermined angle sequentially from θ1.

In step 320, values of initial coordinates (C, L) are assigned in the hue of target of processing. In step S330, chroma C0 (θ) at the highest chroma point in the hue is extracted. In step S340, calculation is executed by assigning the extracted chroma C0 (θ) and the values of initial coordinates (C, L) to the above equations (1) and (2), assigning a hue angle that is now set for processing to the shift coefficients in chroma RC (θ) and lightness RL (θ) and multiplying the remaining of the equations (1) and (2) by the shift coefficients, respectively. By this calculation, values of shifted from the values of coordinates (C, L) are obtained.

After shifting a point from its coordinates (C, L) to its new coordinates (Cnew, Lnew), judgment is made as to whether calculation to obtain (Cnew, and Lnew) has been done for all coordinate points in step S350. This judgment is made for all coordinate points in the gamut, wherein it is sufficient to select the necessary and sufficient number of points for creating the LUT 15b, because the color gamut shift is one step of creating the LUT 15b. Points for which the calculation is executed can be selected in several manners; for example, calculation is executed for only points given by integer values of coordinates or the Lab color space is latticed with predetermined pitches and calculation is executed for only the lattice points.

If the judgment in the step S350 is that calculation has not been done for all coordinate points, the next values of coordinates (C, L) to be assigned to the equations are set in step S360 and the step S330 and subsequent are repeated. If the judgment in the step S350 is that calculation has been done for all coordinate points, whether shift processing has been done for all points over the hue is judged in step S370. Until it has been judged that shift processing has been done for all points over the hue, the step S310 and subsequent are repeated. By executing the calculation described above, the gamut (Lab)' shifted from the color gamut (Lab) of display 18 can be obtained at, for example, hue angle of 180° as shown in FIG. 8.

(5) Color Gamut Expansion

Figure 12:
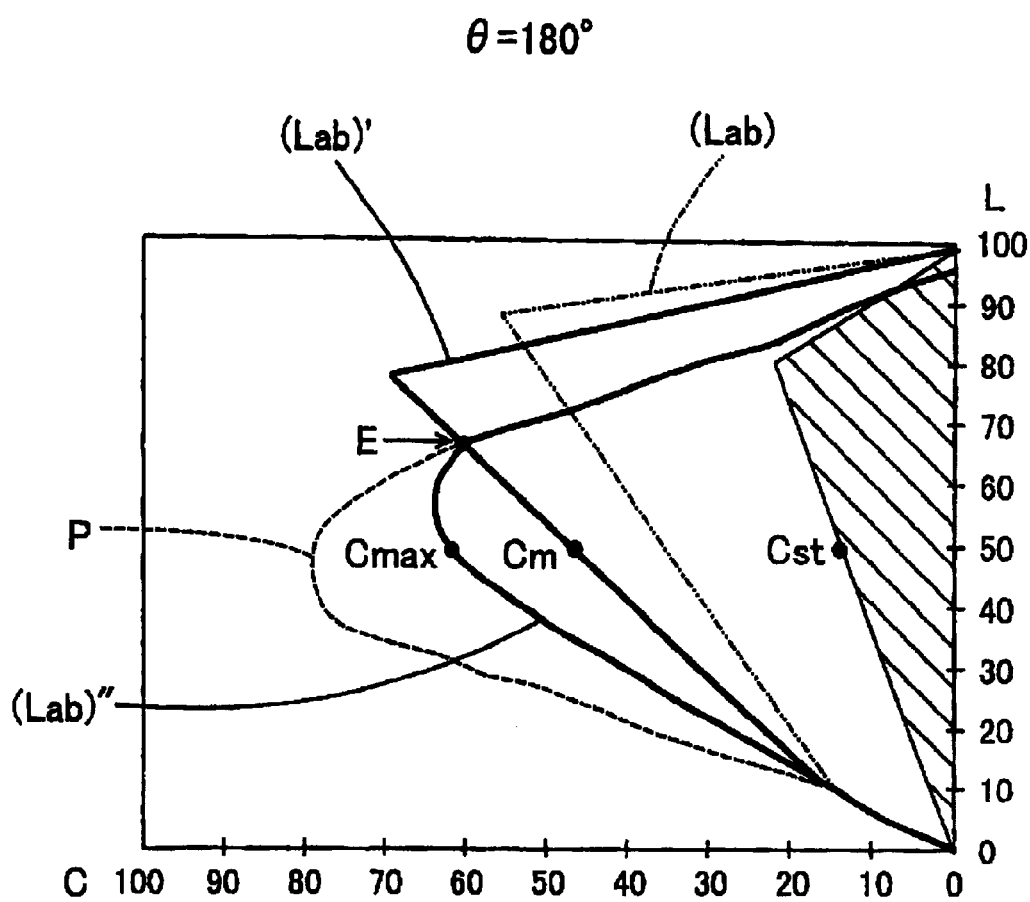
FIG. 12 shows mapping of color gamut forms on the LC plane cut in the Lab space.

In this subsection, the color gamut expansion in the above-mentioned step S230 will be explained in detail. FIG. 12 shows mapping of the color gamut (Lab) of display 18, the color gamut P of printer 40, the gamut (Lab)' shifted by color gamut shift, and the gamut (Lab)" expanded by color gamut expansion on the plane cut at the hue angle of 180° in the Lab space. Here, similarly, chroma C is plotted on the abscissa and lightness L is plotted on the ordinate, ranging "0≦C≦100" and "0≦L≦100," respectively. In the present preferred embodiment, color gamut expansion is executed to increase the chroma. To calculate the chroma rise, first, the maximum chroma value to which chroma will rise is calculated by using the following equation:

[Equation 2]

$$Cmax = Cm(1 + Rm*\alpha*\beta*rate) \quad (3)$$

where, Cmax is the maximum chroma value to which chroma will rise, α is an expansion coefficient depending on hue, β is an expansion coefficient depending on lightness, rate is an expansion coefficient depending on lightness and hue, and Rm is a maximum expansion rate.

Figure 13:
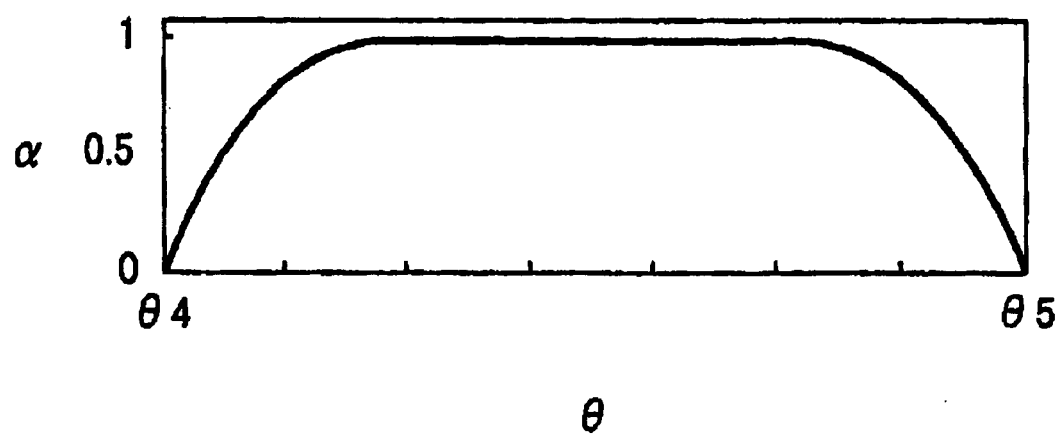
FIG. 13 shows how expansion coefficient α varies, depending on hue angles.

The maximum expansion rate Rm limits the chroma rise to a maximum chroma value. In equation (3), Rm is multiplied by α, β, and rate, so that chroma will rise, depending on hue and lightness. These variables can be set suitably, according to the applied device type of display 18 and printer 40 and other conditions. The expansion coefficient a assumes a finite value that varies within the range of "θ4≦θ≦θ5" (θ4 and θ5 are equal angles from 180°) as is shown in FIG. 13. As the hue angle increases from θ4, the expansion coefficient a gradually rises from 0 to 1. As hue angle decreases from θ5, the expansion coefficient α gradually rises from 0 to 1. In a given range of hue angles between θ4 and θ5, the expansion coefficient α keeps at 1. This efficient is used for taking account of the projection of the color gamut P of printer 40 toward the left, that is, in the direction of the hue angle of 180° in the medium lightness range as shown in FIG. 7 and to make effective use of the projection of the gamut P toward the left.

Figure 14:
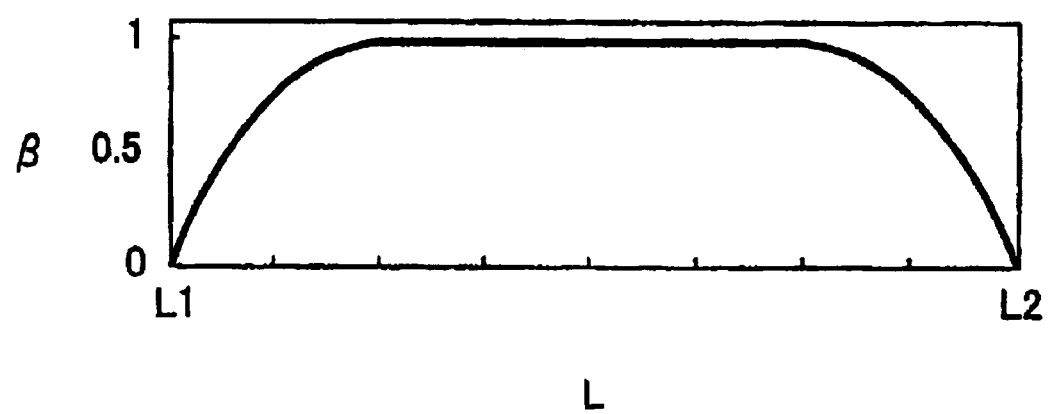
FIG. 14 shows how expansion coefficient β varies, depending on lightness change.

The expansion coefficient β assumes a finite value that varies within the range of "L1≦L≦L2" as is shown in FIG. 14. As the lightness increases from L1, the expansion coefficient β gradually rises from 0 to 1. As the lightness decreases from L2, the expansion coefficient β gradually rises from 0 to 1. In a given range of lightness between L1 and L2, the expansion coefficient β keeps at 1. The slope of the value change of the expansion coefficient β near L2 is gentler than that near L1. This reflects general characteristics that the gamut P appears to be overlap the gamut (Lab) at very low lightness and the gamut (Lab) is wider than the gamut P at very high lightness as shown in FIG. 12. The expansion coefficient β reflects general color gamut characteristics and changes, following the function curve shown in FIG. 14.

Figure 15:
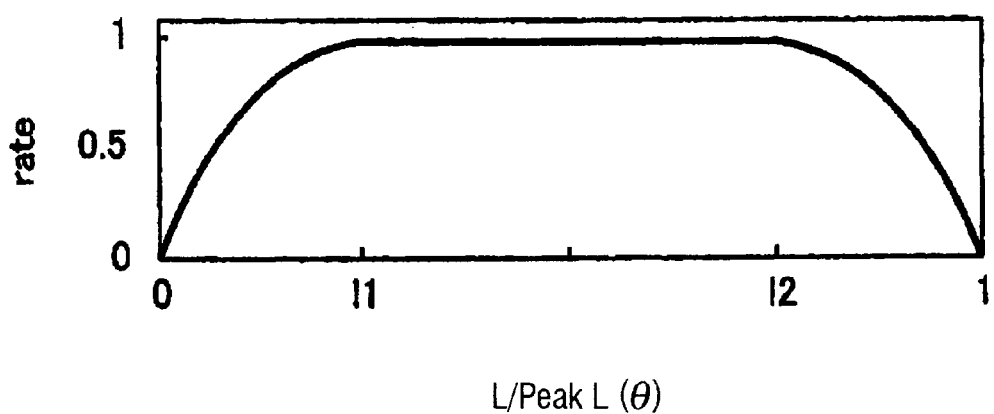
FIG. 15 shows a function curve of expansion coefficient rate.

FIG. 15 shows a function curve of the rate expansion coefficient with lightness L plotted on the abscissa and its peak being L (θ). This peak corresponds to the highest chroma point of the gamut (Lab)' for a hue, that is, the peak of the projection of the gamut toward the left. Because this peak value differs if the hue differs, the rate expansion coefficient for a specific value of lightness assumes a different value, depending on the assumed hue. In FIG. 15, the rate expansion coefficient assumes a finite value that varies within the range of "0≦L/peak L (θ)≦1." The rate expansion coefficient gradually rises from 0 toward 1, reaches 1 at point "11" on the abscissa, and gradually falls to 0 in the section from point "12" to 1. This prevents chroma from rising in the region of lightness higher than the peak.

The maximum chroma value to which chroma will rise is calculated by assigning values to the variables described above in the equation (3). Once this calculation has been executed, taking account of the ratio of the chroma values of Cnew obtained by the color gamut shift to the thus obtained maximum chroma value, how chroma will rise at any point is calculated. For each coordinate point in the gamut once shifted, chroma Clnew can be calculated as the value to which chroma will rise, by which gamut expansion will take place.

[Equation 3]

$$Clnew = Cst + (Cnew - Cst)\frac{Cmax - Cst}{Cm - Cst} \quad (4)$$

Calculation is executed so that chroma will not rise in a region where chroma is lower than chroma Cst. The value of Cst is determined by multiplying the maximum chroma value Cm in the gamut shifted by color gamut shift by a value of 0.2 to 0.4 in the present preferred embodiment.

Consequently, chroma rise does not take place for colors in the shaded region in FIG. 12, that is, colors showing little colorfulness near the lightness axis. In the present preferred embodiment, the color gamut expansion is restricted so that chroma rise does not exceed the highest chroma in the color gamut P of printer 40. Accordingly, chroma does not rise in the region lighter than point E at the hue angle of 180° as shown in FIG. 12. Any of diverse methods may be adopted to limit the chroma rise and set a lightness range within which chroma will not rise. For example, it is possible that the compression in the above-mentioned step S240 is arranged to produce final gamut mapping that falls within the color gamut of printer 40. In this case, it is not necessary to restrict the chroma rise by color gamut expansion to less than the highest chroma in the color gamut P of printer 40 as described above.

Figure 16:
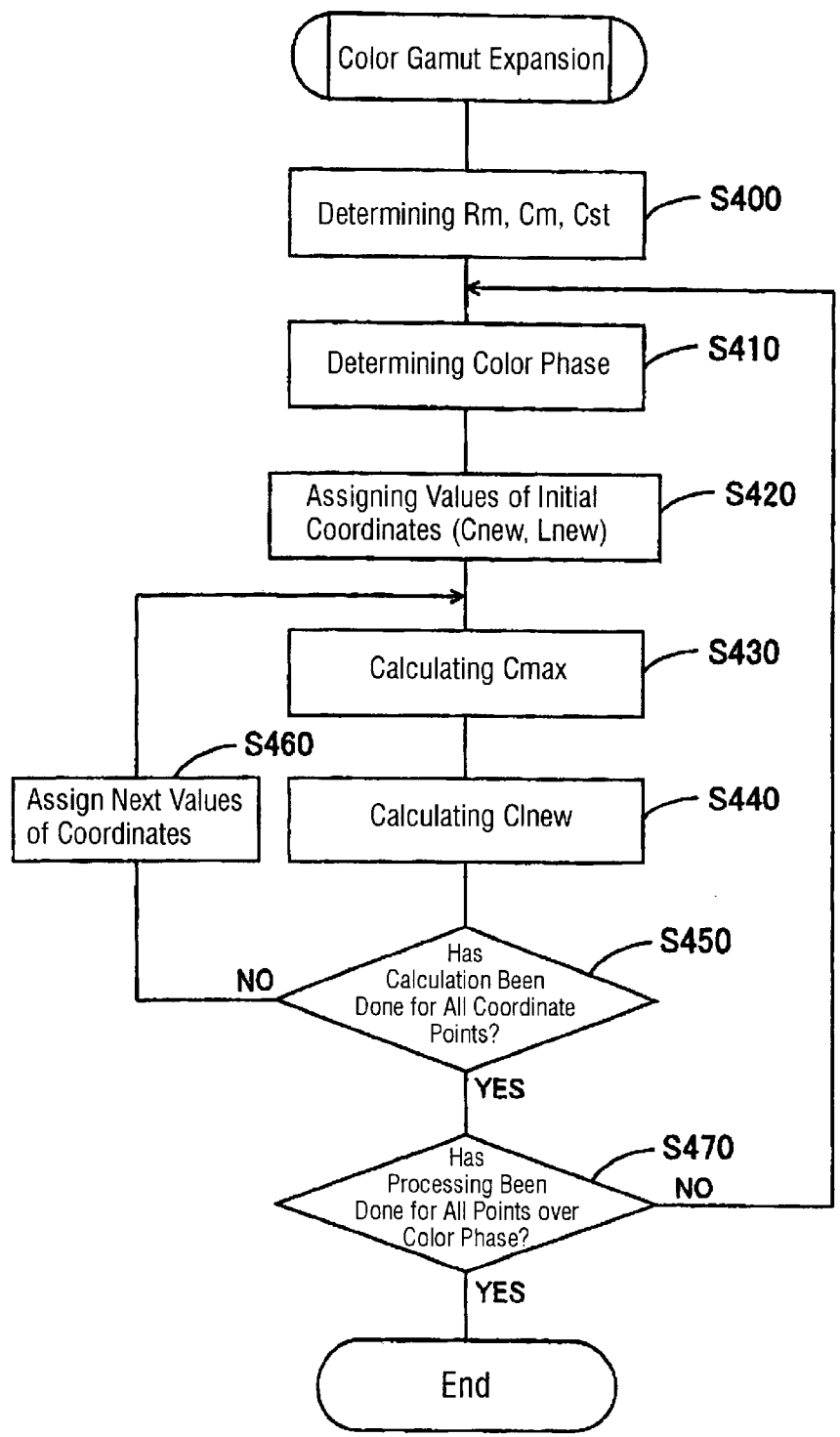
FIG. 16 is a flowchart illustrating color gamut expansion processing.

FIG. 16 is a flowchart illustrating the processing of color gamut expansion using the above equations (3) and (4). Referring to FIG. 16, at the first step S400, the maximum expansion rate Rm, the maximum chroma value Cm in the gamut shifted by color gamut shift, and chroma Cst are determined. In the next step S410, a hue for which the expansion processing is carried out is determined. In the present preferred embodiment, the hue range of "θ4 to θ5" is set as the target of processing, and in this range, the expansion coefficient a varies, depending on the hue angles. The expansion processing is carried out, while changing the hue angle in steps of a predetermined angle sequentially from θ4.

In step S420, values of initial coordinates (Cnew, Lnew) obtained after the color gamut shift are assigned in the hue of target of processing. In step S430, the maximum chroma value Cmax to which chroma will rise is determined by calculation according to the above equation (3). This maximum chroma value is calculated for each value of lightness for defining the boundary of the gamut to expand. Then, in step S440, calculating chroma Clnew to which the chroma of the target coordinate point will rise is executed by assigning the maximum chroma value Cmax, and Cst, Cm, and Cnew to the equations (3) and (4). The coordinates (Cnew, Lnew) assuming the thus calculated chroma Clnew and the lightness value of Lnew of the point correspond to the coordinates (Cnew, Lnew) of the point after the color gamut shift, and therefore also correspond to the coordinates (C, L) in the color gamut (Lab) before the shift. Thus, by the above calculation, the gamut that has been shifted and expanded in similar correspondence to the color gamut (Lab) of display 18 can obtained.

After chroma Clnew is calculated in the step S440, judgment is made as to whether calculation to obtain Clnew has been done for all coordinate points in step S450. As noted above, this judgment is made for all coordinate points in the gamut, wherein it is sufficient to select the necessary and sufficient number of points for creating the LUT 15b, because the color gamut expansion is regarded as one step of creating the LUT 15b. Points for which the calculation is executed can be selected in several manners; for example, calculation is executed for only points given by integer values of coordinates or the Lab color space is latticed with predetermined pitches and calculation is executed for only the lattice points.

If the judgment in the step S450 is that calculation has not been done for all coordinate points, the next values of coordinates (Cnew, Lnew) to be assigned to the equations are set in step S460 and the step S430 and subsequent are repeated. If the judgment in the step S450 is that calculation has been done for all coordinate points, whether expansion processing has been done for all points over the hue is judged in step S470. Until it has been judged that expansion processing has been done for all points over the hue, the step S410 and subsequent are repeated. By executing the calculation described above, the gamut (Lab)" expanded from the gamut (Lab)" can be obtained at, for example, hue angle of 180° as shown in FIG. 12.

Figure 17:
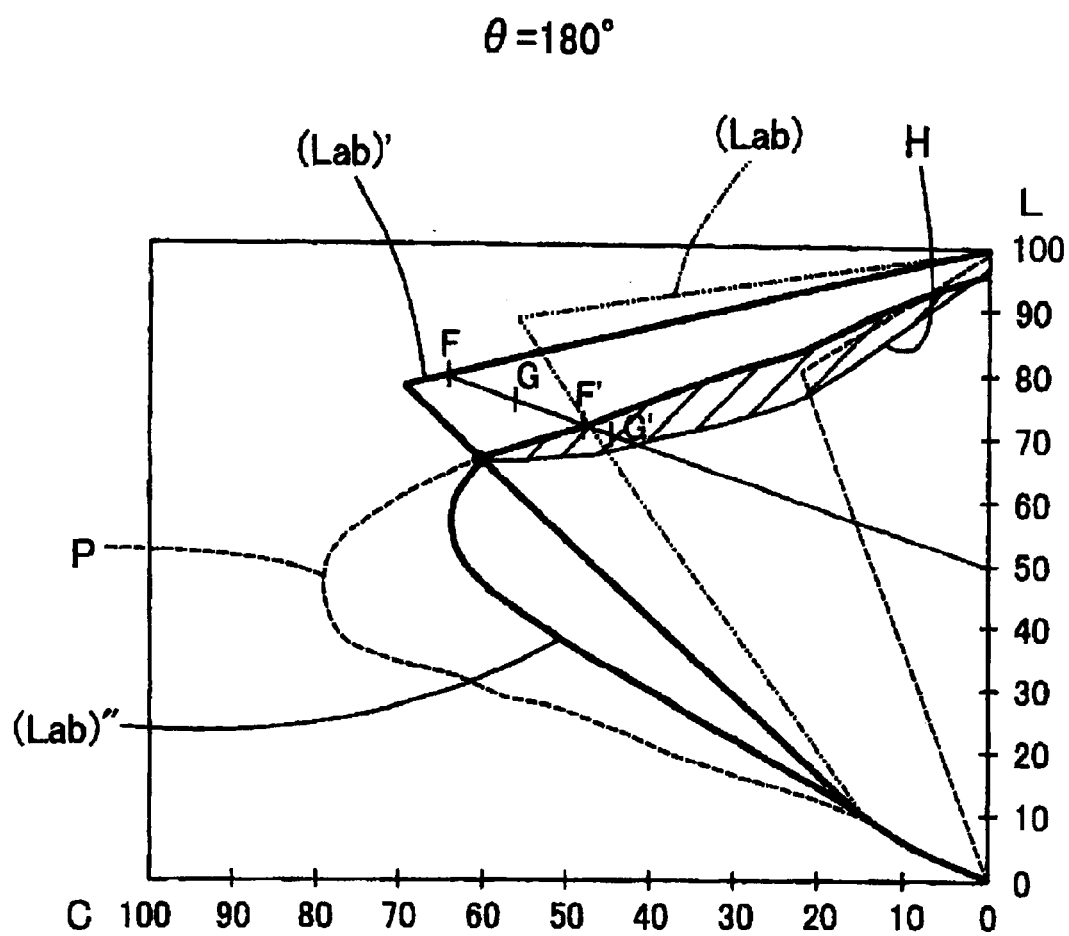
FIG. 17 shows mapping of color gamut forms on the LC plane cut in the Lab space.

The (Lab)" thus obtained after the processing of color gamut shift and color gamut expansion includes a section that falls out of the color gamut P of printer 40 in the higher lightness part. In the present preferred embodiment, as a means of correction, compression is executed in the above-mentioned step. S240 in FIG. 6, so that the entirety of the gamut (Lab)" will fall within the color gamut of printer 40. Specifically, the points out of the color gamut of printer 40 are moved toward a middle value 50 of lightness to fall within the shaded region H as shown in FIG. 17. For example, points F and G on the line from the point F to the middle value 50 of lightness (chroma of 0) are moved to points F' and G' respectively along the line. For this compression, kinds of processing techniques are publicly known and any of these techniques can be adopted.

As the result of the above-described processing, all points (values) by the coordinates (C, L) before transformation are mapped within the color gamut of printer 40. The thus mapped gamut (Lab)" includes high chroma points that are out of the color gamut (Lab) of display 18, but falls within the color gamut of printer 40 in the medium lightness range. Eventually, the LUT 15*b* is created, based on this mapping of the gamut (Lab)" in similar correspondence to the color gamut (Lab) of display 18 and this method enables the printer 40 to print images with finer tones than images visible on the display 18.

(6) Preferred Embodiment 2

Figure 18:
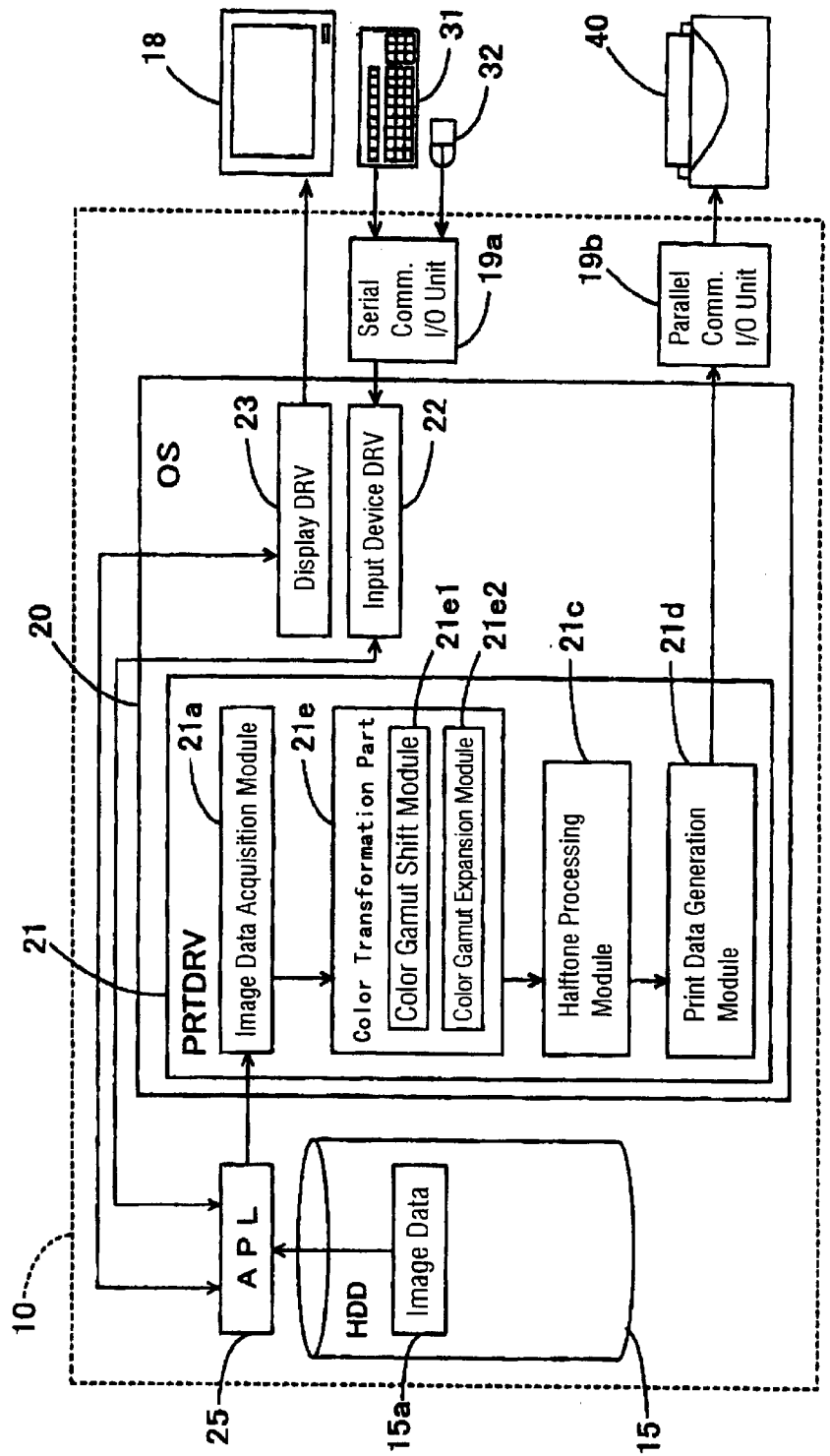
FIG. 18 is a block diagram showing the simplified structure of the OS and related components wherein the color transformation program is provided as a color transformation part in accordance with another preferred embodiment of the invention.

For print operation in the above-described preferred embodiment, the color transformation module 21*b* of the PRTDRV 21 makes the computer execute color transformation by reference to the LUT 15*b* that maintains the data reflecting the processing result of color gamut shift and color gamut expansion. In this embodiment, by using the LUT 15*b* arranged for color transformation, the print operation be programmed such that the processing of color gamut shift and color gamut expansion need not be executed each time color transformation is executed. In another preferred embodiment, the print operation may be programmed such that the processing of color gamut shift and color gamut expansion is executed during the color transformation process. FIG. 18 shows the simplified structure of the OS and related components wherein the processing of color gamut shift and color gamut expansion is executed under the PRTDRV 21.

In the structure shown in FIG. 18, which is nearly the same as that shown in FIG. 2, the PRTDRV 21 includes a color transformation part 21*e* instead of the color transformation module 21*b*. The color transformation part 21*e* consists of a color gamut shift module 21*e*1 and a color gamut expansion module 21*e*2. The color gamut shift module 21*e*1 makes the computer execute the above-described color gamut shift processing and the color gamut expansion module 21*e*2 makes the computer execute the above-described color gamut expansion processing. Specifically, when RGB data in compliance with the sRGB standards is acquired under the control of the image data acquisition module 21*a*, the color transformation part 21*e* makes the computer transform the RGB data into Lab data, determine its color domain, and determine the color gamut of printer 40 in the applied hue in the Lab space, based on the ICC profile of the printer 40.

Then, the color gamut shift module 21*e*1 makes the computer execute the above-described steps S330 and S340 in FIG. 11 per dot of the RGB data and map the above-described gamut (Lab)'. Moreover, the color gamut expansion module 21*e*2 makes the computer execute the above-described steps S430 and S440 in FIG. 16 and map the above-described gamut (Lab)". At this time, if color data by the coordinates after the gamut shift and expansion falls out of the color gamut of printer 40, the computer executes compression in the above-described step S240. As the result of the processing execution, the RGB data is transformed into any color in the Lab space that is out of the color gamut of display 18, but falls within the color gamut of printer 40. Then, the result of the transformation is further transformed into CMYK data based on the ICC profile of the printer 40 and the CMYK data is handed over to the halftone processing module 21*c*.

In this way, it is also possible to make the computer 10 execute the processing of color gamut shift and color gamut expansion as well as color transformation when making the printer print a certain image. According to the configuration of this embodiment (Embodiment 2), the invention enables the printer 40 to output a desirable color image by making more effective use of its color gamut as is the case in the preceding preferred embodiment. In Embodiment 2, the computer must execute the processing of color gamut shift and color gamut expansion, but need not execute the interpolation processing. As an alternative to the embodiment in which the above-described color transformation module 21*b* and color transformation part 21*e* are installed in the computer that operates separately from the printer 40, it is also possible to provide the printer 40 with the color transformation module 21*b* and color transformation part 21*b* as its internal functions.

(7) Preferred Embodiment 3

Figure 19:
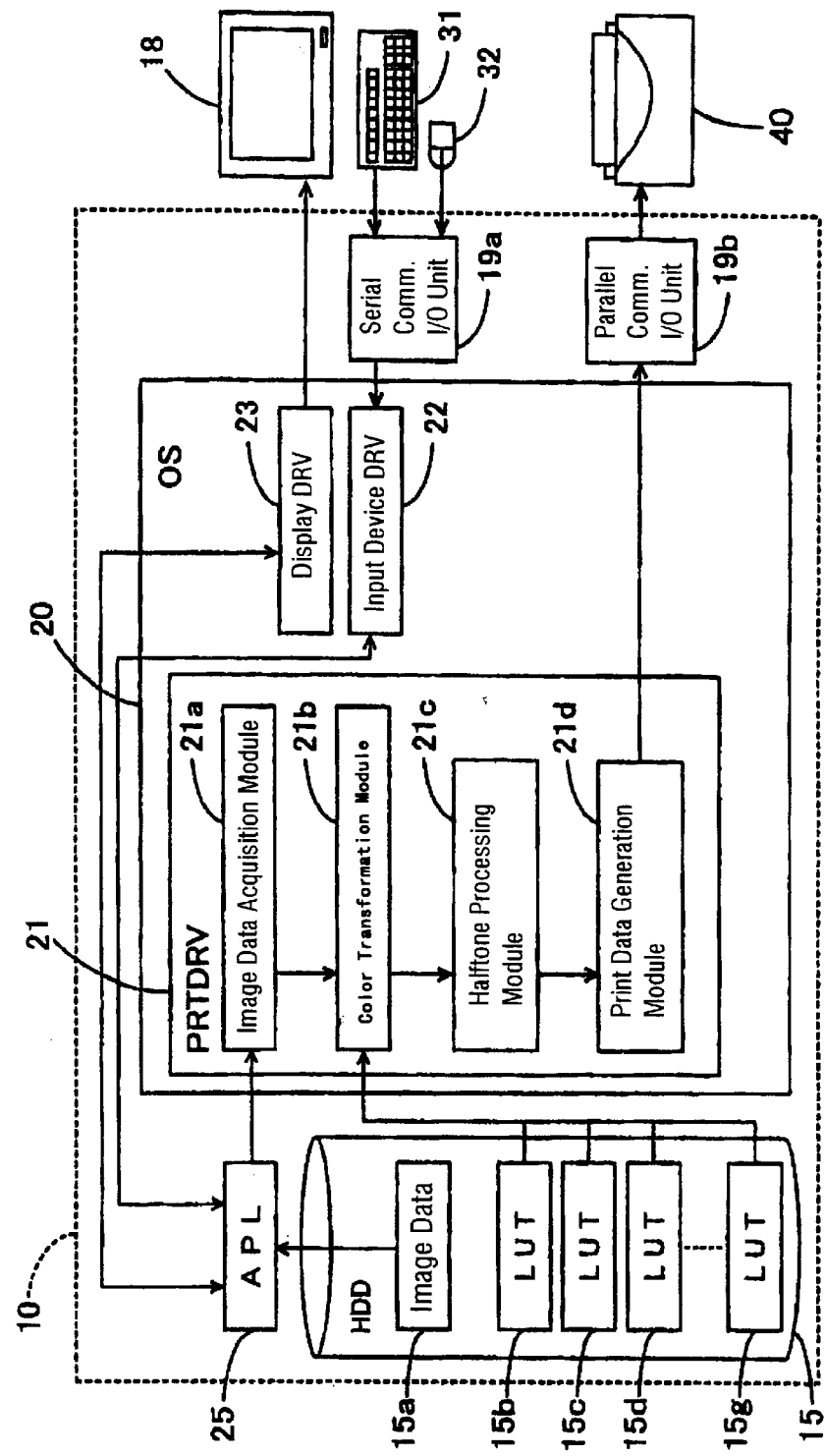
FIG. 19 is a block diagram showing the simplified structure of the OS and related components wherein the color transformation program is provided as the color transformation module, according to a preferred embodiment 3.

The color gamut of printer 40 changes when change is made to the device type of the printer 40, image processing medium, and ink used on the printer. Thus, it is desirable to arrange the LUTs for the possible varieties of printer type, image processing medium, and ink on the printer 40 as described above. FIG. 19 shows the simplified structure of the OS and related components wherein different LUTs can be used for different image processing media and ink sets used on the printer 40 under the PRTDRV20. In the structure shown in FIG. 19, which is nearly the same as that shown in FIG. 2, a plurality of LUTs are provided so that the color transformation module 21*b* of the PRTDRV21 will select and use an appropriate LUT for reference, according to the print condition setting performed in advance.

Specifically, the PRTDRV 21 includes a module not shown that can receive the status of printer 40 via the parallel communication I/O unit 19*b* and determines what ink set is in use, based on the status. The module determines what image processing medium is in use, based on the image processing medium selected by the user, using a Printer Properties window which is not shown. These methods of ink set and image processing medium determination are illustrative. Means for allowing the user to select a desirable ink set may be used or the printer 40 may be provided with an image processing medium determination mechanism by which the image processing medium in use is automatically recognized.

In the disk storage on the HDD 15 shown in FIG. 19, LUTs 15*b* to 15*g* are stored whose contents are different for different combinations of image processing medium and ink set. In Embodiment 3, two kinds of ink sets can be used on the printer 4: one ink set consisting of six colors: cyan (C), magenta (M), yellow (Y), black (K), light cyan (lc), and light magenta (1m); the other consisting of seven colors: cyan (C), magenta (M), yellow (Y), black (K), light cyan (lc), light magenta (lm), and dark yellow (DY). With each ink set, three kinds of image processing media can be used: photo1 (glossy paper), photo2 (glossy paper), and plain paper. Accordingly, six LUTs are prepared beforehand. Of course, the usable ink sets and image processing media are not limited to those mentioned above and the number of LUTs is not limited to six.

These LUTs are arranged for six gamuts of printer's color gamut as determined by combination of image processing medium and ink set. Because the color gamut of printer fixed in the above-described step S210 in FIG. 6 varies for each combination of image processing medium and ink set, the CMYK data obtained by the result of processing in the steps S220 to S240 differs, and consequently, different LUTs are created. FIG. 20 shows a table listing symbolic values of parameters given for each combination of ink set and image processing medium, which are used for color gamut shift and color gamut expansion, according to the printer's color gamut that is mapped as the target gamut of color output.

In FIG. 20, the ink set consisting of six colors is assumed to be ink set A and the ink set consisting of seven colors ink set B. As shown, the LUT for paper photo1 combined with ink set A is LUT 15b, the LUT for paper photo2 combined with ink set A is LUT 15c, and the LUT for plain paper combined with ink set A is LUT 15d. The LUT for paper photo1 combined with ink set B is LUT 15e, the LUT for paper photo2 combined with ink set B is LUT 15f, and the LUT for plain paper combined with ink set B is LUT 15g.

In Embodiment 3, the printer' color gamut changes in size, according to the type of paper on which to print images; that is, its gamut is large when photo1 is used, medium with when photo2 is used, and small when plain paper is used with either ink set. Generally, the larger the color gamut, the greater will be the displacements by color gamut shift and the degree of the chroma rise by color gamut expansion. The LUTs 15b to 15g are created, based on the parameter values that are properly selected to be used in the processing of color gamut shift and color gamut expansion to make the displacements by shift and expansion suitable for the color gamut shape that is predetermined for each combination of ink set and paper.

The displacements of the highest chroma point in chroma $\Delta C$ and in lightness $\Delta L$, which are the parameters for color gamut shift, are set greater for larger color gamut. Specifically, actual values are assigned to these parameters, subject to constraints: $\Delta C1 > \Delta C2 > \Delta C3$, $\Delta C4 > \Delta C5 > \Delta C3$, $\Delta L1 > \Delta L2 > \Delta L3$, and $\Delta L4 > \Delta L5 > \Delta L3$. For the shift coefficients in chroma RC ($\theta$) and lightness RL ($\theta$), their value ranges are set greater for larger color gamut. However, all parameters are not necessarily set different for different shapes of color gamuts. In FIG. 20, LUT 15d and LUT 15g are created, based common values $\Delta C3$ and $\Delta L3$ used as the displacement parameters in chroma $\Delta C$ and lightness $\Delta L$ and common functions RC2 ($\theta$) and RL2 ($\theta$) used as the shift coefficients in chroma RC ($\theta$) and lightness RL ($\theta$). LUTs 15b, 15c, 15e, and 15f are created, based on common functions RC1 ($\theta$) and RL1 ($\theta$) used as the shift coefficients in chroma RC ($\theta$) and lightness RL ($\theta$). For the shift coefficients in chroma RC ($\theta$) and lightness RL ($\theta$), value assignment in the function form instead of adjusting the value range can be adopted.

Figure 21:
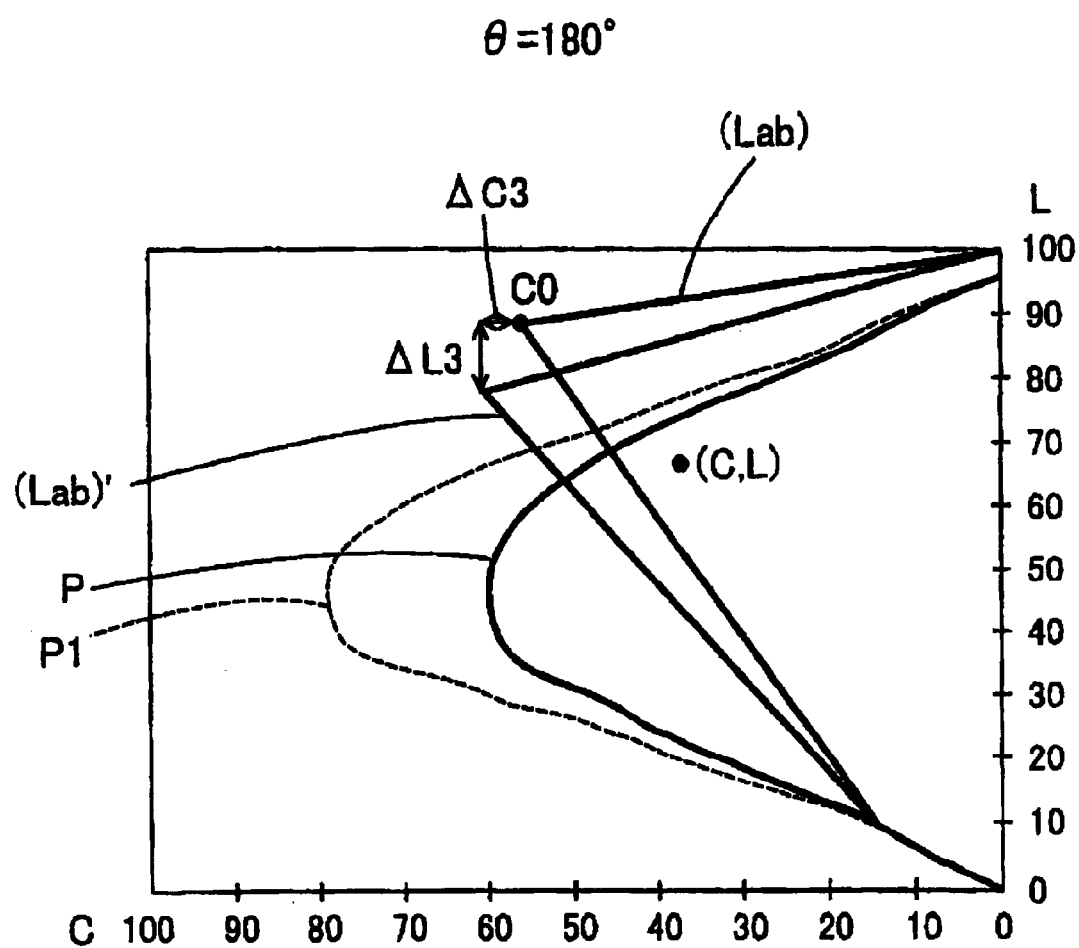
FIG. 21 is gamut mapping illustration for explaining different values of parameters assigned for each color gamut for color gamut shift.
Figure 22:
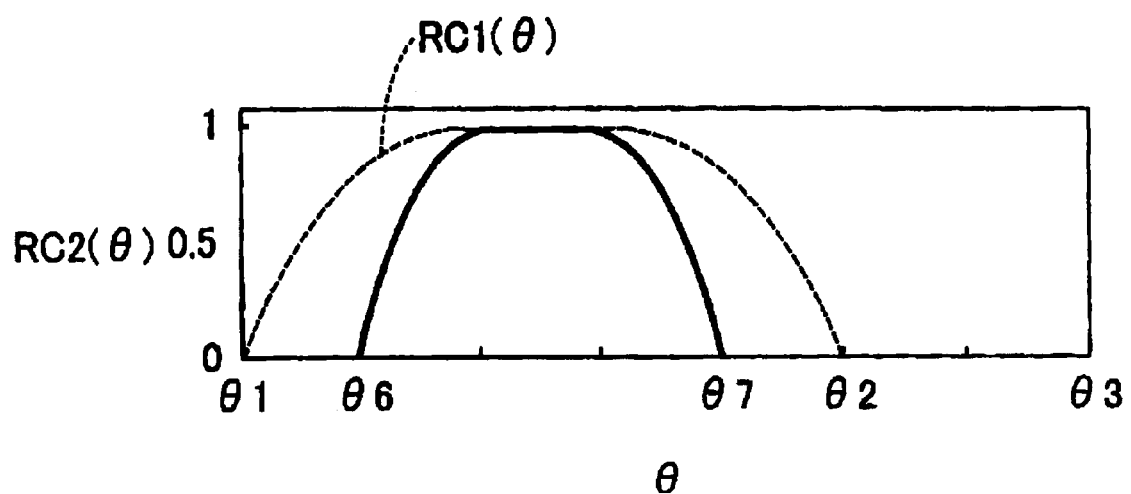
FIG. 22 is shift coefficient RC (θ) range illustration for explaining different values of parameters assigned for each color gamut for color gamut shift.
Figure 23:
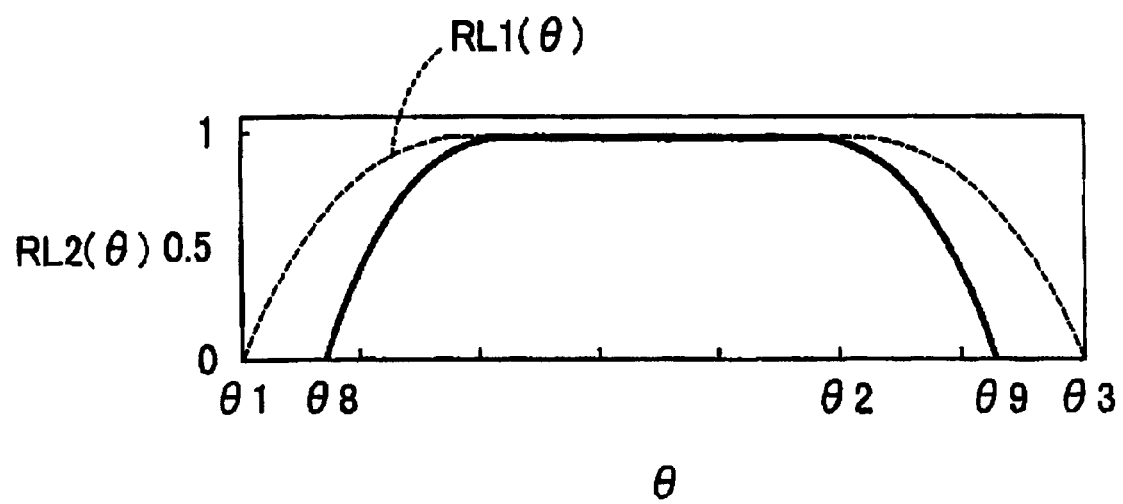
FIG. 23 is shift coefficient RL (θ) range illustration for explaining different values of parameters assigned for each color gamut for color gamut shift.

FIGS. 21 to 23 are provided for explaining different parameter values assigned for each color gamut of printer in the processing of color gamut shift. In Embodiment 3, the displacements of the highest chroma point in chroma $\Delta C2$ and in lightness $\Delta L2$ are assumed identical to the displacements $\Delta C$ and $\Delta L$ shown in FIG. 8. The shift coefficients in chroma RC1 ($\theta$) and lightness RL1 ($\theta$) are assumed identical to the shift coefficient in chroma RC ($\theta$) shown in FIG. 9 and the shift coefficient in lightness RL ($\theta$) shown in FIG. 10. Parameter values different from the above ones are given in FIGS. 21 to 23, which are used for creating the LUT 15d that is prepared for plain paper. These parameter values apply to the printer's color gamut that is smaller than that mapped with the parameters shown in FIGS. 8 to 10 for the combination of ink set A and paper photo2.

FIG. 21 is provided for explaining the displacements of the highest chroma point in chroma $\Delta C3$ and in lightness $\Delta L3$. FIG. 21 shows mapping of the color gamut (Lab) of display 18, the color gamut P of printer 40 for the combination of ink set A and plain paper, and the gamut (Lab)' shifted by color gamut shift on the plane cut at the hue angle of 180° in the Lab space. The color gamut P1 drawn with a dotted line is identical to the printer's color gamut shown in FIG. 8 for the combination of ink set A and paper photo2. In FIG. 21, here again, chroma C $(=(a^{}2+b^{}2)^{**}(\frac{1}{2}))$ is plotted on the abscissa and lightness L is plotted on the ordinate, ranging "$0 \leq C \leq 100$" and "$0 \leq L \leq 100$," respectively.

As shown in FIG. 21, at the hue angle of 180°, the printer's color gamut P for the combination of ink set A and plain paper is smaller than that for the combination of ink set A and paper photo 2, but somewhat larger than the color gamut (Lab) of display 18 in a certain lightness range. If, as the parameter values, the displacements of the highest chroma point in chroma $\Delta C2$ and in lightness $\Delta L2$ are applied, unnaturally colored print results will be produced. However, if excessive shift is suppressed during color gamut shift processing, unnatural color transformation can be prevented. Thus, the displacements of the highest chroma point in chroma $\Delta C3$ and in lightness $\Delta L3$ are applied for the smaller printer's color gamut P shape; these displacements are smaller than the displacements $\Delta C2$ and $\Delta L2$ shown in FIG. 8.

Although being smaller than the gamut P1, the gamut P is still larger than the color gamut (Lab) of display 18 in the region around the hue angle of 180° and in a certain lightness range. With regard to the dependence of shift on the hue angles and lightness change, the value ranges of its related coefficients are reduced, though the same tendencies as shown in FIGS. 9 and 10 are kept. Specifically, the shift coefficient in chroma RC2 ($\theta$) is applied that varies within the range of "$\theta 6 \leq \theta \leq \theta 7$" ($\theta 1 \leq \theta 6$, $\theta 7 \leq \theta 2$) as is shown in FIG. 22; that is, it is a function that assumes "1" in a given range of hue angles between $\theta 6$ and $\theta 7$. The shift coefficient in lightness RL2 ($\theta$) is applied that varies within the range of "$\theta 8 \leq \theta \leq \theta 9$" ($\theta 1 \leq \theta 8$, $\theta 9 \leq \theta 3$) as is shown in FIG. 23; that is, it is a function that assumes "1" in a given range of hue angles between $\theta 8$ and $\theta 9$.

When creating the LUT 15d, the above-mentioned parameter values different from those used when creating the LUT 15c are used to reduce the displacement by shift and assigned to the equations (1) and (2) when executing the calculation in the step S220 shown in FIG. 6. Thereby, excessive color gamut shift is suppressed and the LUT that can prevent unnatural color transformation can be prepared. For other LUTs, by properly selecting optimum values of parameters for a gamut of the printer's color gamut, color transformation can be adjusted to small difference in the color gamut shape. In the sense of adjustment to difference in the color gamut shape, color gamut expansion is adjusted in the same manner. In Embodiment 3, it is advisable to properly change the parameter values used in the processing of color gamut expansion as well, adaptively for each gamut of printer's color gamut. The maximum expansion rate Rm that is a parameter for color gamut expansion is set greater for larger color gamut of printer; that is, Rm2>Rm2>Rm3. With regard to the expansion coefficients $\alpha$, $\beta$, and rate, their value ranges are set broader for larger color gamut of printer or their values are assigned in the function form so that the value will vary to a greater extent for larger color gamut of printer.

FIGS. 24 to 27 are provided for explaining different parameter values assigned for each color gamut of printer in the processing of color gamut expansion. In Embodiment 3, the maximum expansion rate Rm2 and the expansion coefficients α2, β2, and rate2 are assumed identical to the above-described maximum expansion rate Rm and the expansion coefficients α, β, and rate shown in FIGS. 13 to 15, respectively. Parameter values different from the above ones are given in FIGS. 24 to 27, which are used for creating the LUT 15d that is prepared for plain paper. The parameter values shown in FIGS. 24 to 27 apply to the printer's color gamut that is smaller than that to which the parameter values shown in FIGS. 13 to 15 apply.

Figure 24:
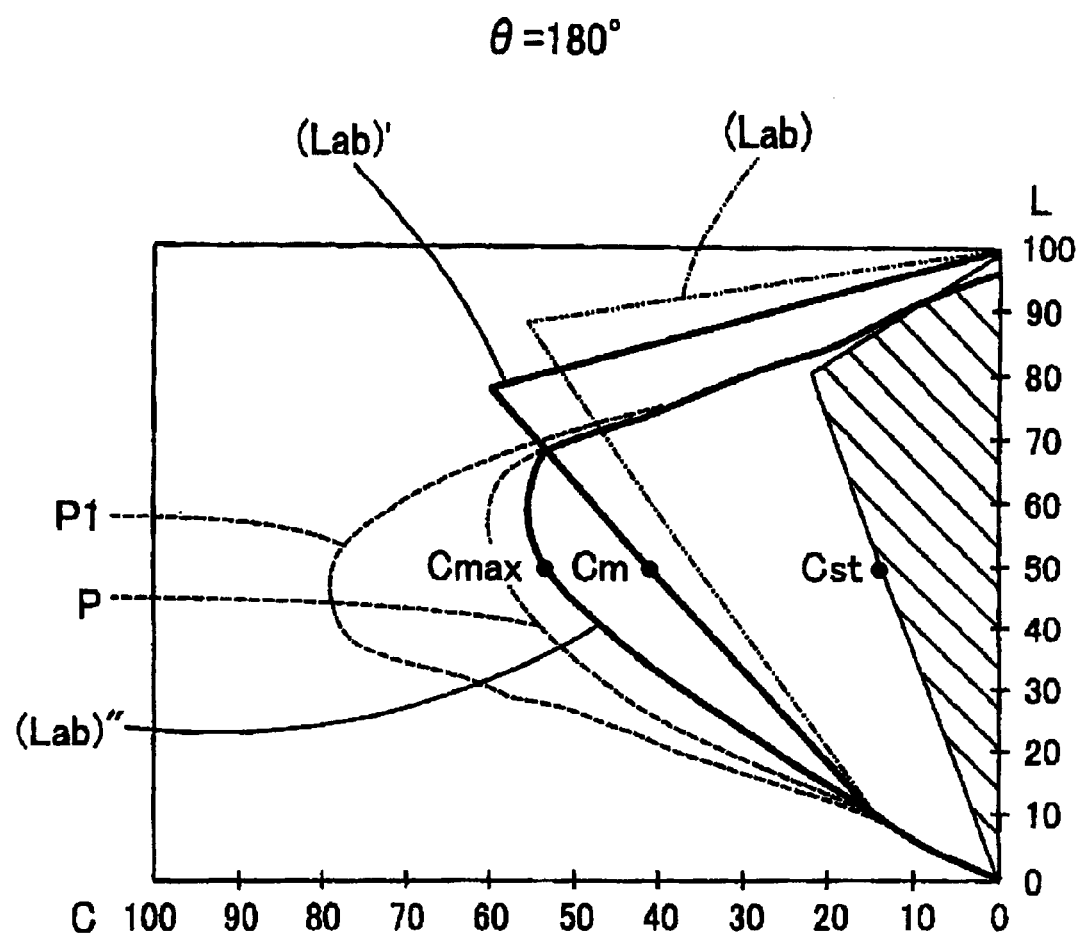
FIG. 24 is gamut mapping illustration for explaining different values of parameters assigned for each color gamut for color gamut expansion.

FIG. 24 shows mapping of the color gamut (Lab) of display 18, the color gamut P of printer 40 for the combination of ink set A and plain paper, the gamut (Lab)' shifted by color gamut shift, and the gamut (Lab)" expanded by color gamut expansion on the plane cut at the hue angle of 180° in the Lab space. Here again, the color gamut P1 drawn with a dotted line is identical to the printer's color gamut shown in FIG. 8 for the combination of ink set A and paper photo2. In FIG. 24, here again, chroma C is plotted on the abscissa and lightness L is plotted on the ordinate, ranging "$0 \leq C \leq 100$" and "$0 \leq L \leq 100$," respectively.

As shown in FIG. 24, the printer's color gamut P for the combination of ink set A and plain paper is smaller than that for the combination of ink set A and paper photo 2, but somewhat larger than the color gamut (Lab) of display 18 in a certain lightness range. Accordingly, it is advisable to expand the gamut (Lab)' along the chroma axis, but expansion should be adjusted to a smaller extent than expansion applied to the gamut P1. As the parameter values, the maximum expansion rate Rm3 and the expansion coefficients α3, β3, and rate3 are applied for the smaller printer's color gamut P shape. The values of Rm3, α3, β3, and rate3 are set smaller than the maximum expansion rate Rm2 and the expansion coefficients α2, β2, and rate2 and color gamut expansion is executed.

Figure 25:
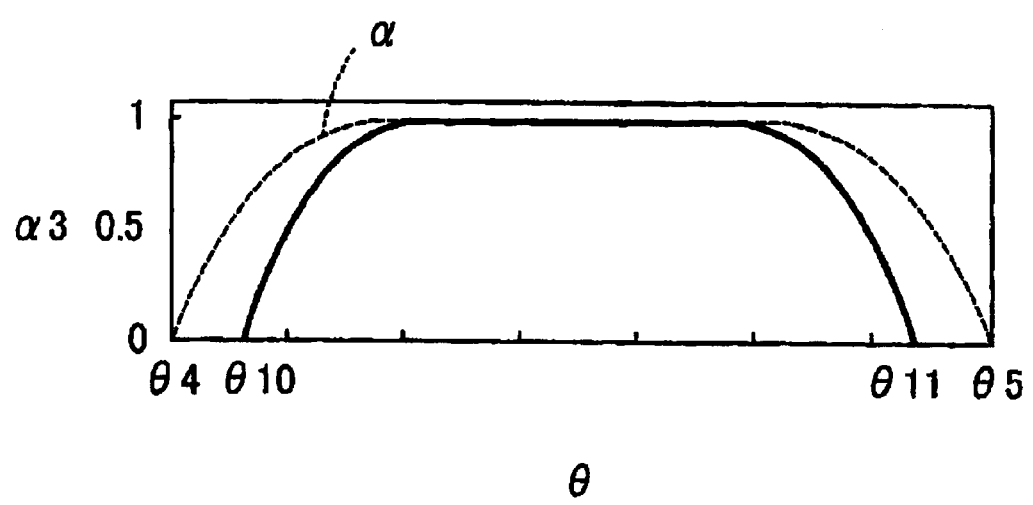
FIG. 25 is expansion coefficient α range illustration for explaining different values of parameters assigned for each color gamut for color gamut expansion.
Figure 26:
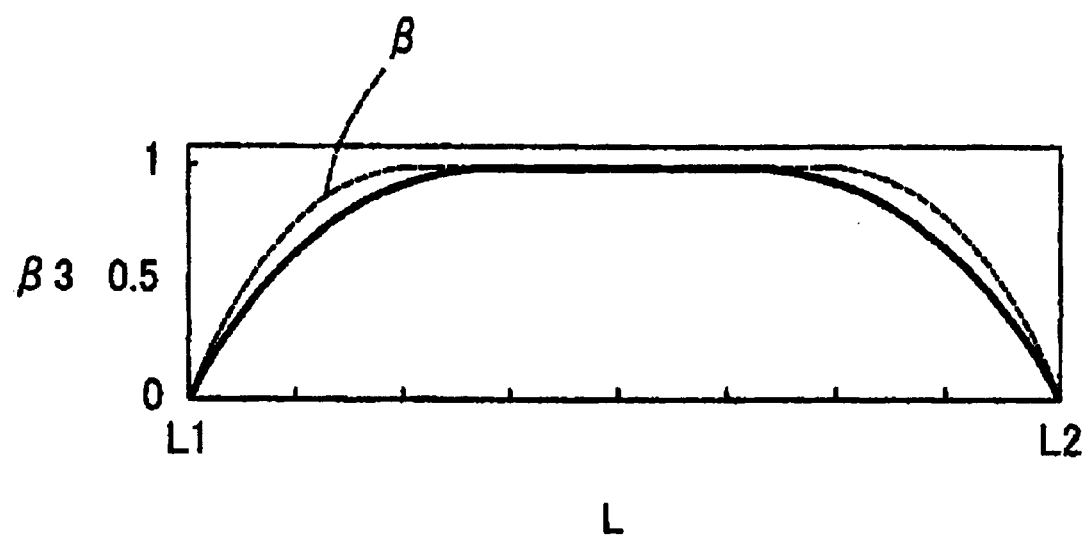
FIG. 26 is expansion coefficient β range illustration for explaining different values of parameters assigned for each color gamut for color gamut expansion.
Figure 27:
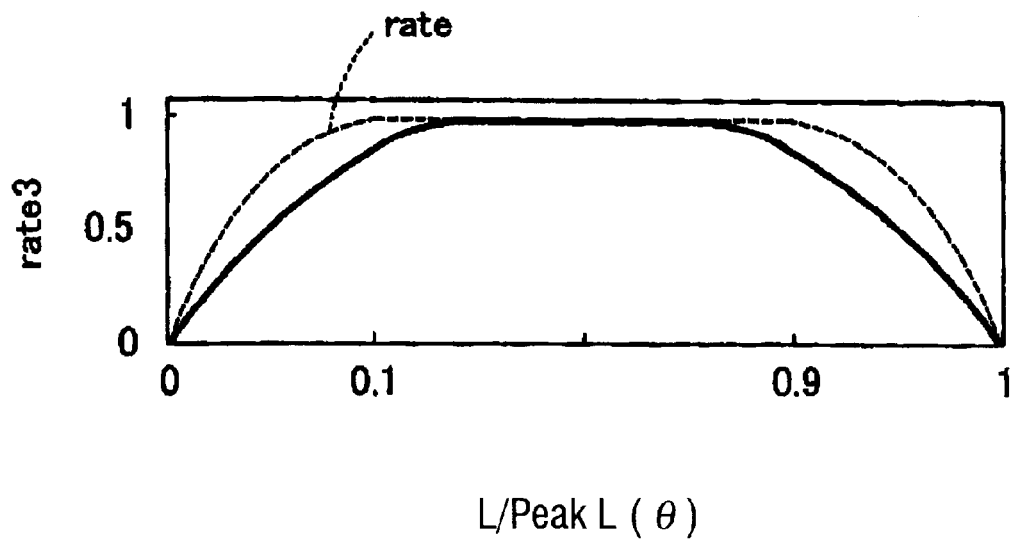
FIG. 27 is expansion coefficient rate range illustration for explaining different values of parameters assigned for each color gamut for color gamut expansion.

With regard to the dependence of these parameters on the hue angles and lightness change, the value ranges of the parameters are reduced or their values are assigned to reduce expansion in the function form, though the same tendencies as shown in FIGS. 13 to 15 are kept. Specifically, the expansion coefficient α3 varies within the range of "$\theta 10 \leq \theta \leq \theta 11$" ($\theta 4 \leq \theta 10$, $\theta 11 \leq \theta 5$) as is shown in FIG. 25; that is, it is a function that assumes "1" in a given range of hue angles between $\theta 10$ and $\theta 11$. The expansion coefficient β3 varies within the range of "$L1 > \theta \leq L2$" as is shown in FIG. 26. As compared with expansion coefficient β shown in FIG. 14, the curve of value change of β3 as lightness L rises from L1 before β3 reaches "1" and the curve as β3 falls from "1" to "0" while lightness L continues to rise are gentler. Moreover, the expansion coefficient rate3 varies within the range of "$0 \leq L/\text{peak } L (\theta) \leq 1$" as is shown in FIG. 27. As compared with expansion coefficient rate shown in FIG. 15, the curve of value change of rate3 as L/peak L ($\theta$) rises from 0 before rate3 reaches "1" and the curve as L/peak L ($\theta$) falls from "1" before rate3 reaches "1" are gentler.

When creating the LUT 15d, the above-mentioned parameter values different from those used when creating the LUT 15c are used to reduce the displacement by expansion and assigned to the equations (3) and (4) when executing the calculation in the step S230 shown in FIG. 6. Thereby, the LUT that prevents over-emphasized chroma of colors can be prepared. For other LUTs, by properly selecting optimum values of parameters for a gamut of the printer's color gamut, color transformation can be adjusted to small difference in the color gamut shape. Of course, the parameter values shown in FIG. 20 are exemplary. The parameter values may be set different for all gamuts of printer's color gamut and common parameter values other than those shown in FIG. 20 may be applied for different sizes of color gamut. Even if different values are assigned to the displacements of the highest chroma point in chroma ΔC and in lightness ΔL and nearly the same value is assigned directly or in the function form to the shift coefficients in chroma RC ($\theta$) and lightness RL ($\theta$), the maximum expansion rate Rm, and the expansion coefficients α, β, and rate, very fine colored print results may be produced. By arranging in this way the LUTs 15b to 15g for each gamut of printer' color gamut, the color transformation module 21b of the PRT-DRV21 enables the computer to execute color transformation and print operation so that the most suitable chroma for each combination of ink set and image processing medium will be obtained.

(8) Preferred Embodiment 4

While relatively great displacements by shift and expansion are set for larger color gamut of printer in Embodiment 3, it is not always necessary to apply the tendency that displacements increase in proportional to the increase in gamut size to all possible shapes of printer's color gamut when executing the processing of color gamut shift and color gamut expansion. FIG. 28 shows a table listing symbolic values of parameters given for each combination of ink set and image processing medium, which are used for color gamut shift and color gamut expansion, according to a preferred Embodiment 4. Most of the parameter values given in FIG. 28 are the same as given in FIG. 20, but some of them are different. Specifically, when creating an LUT 15c for the combination of ink set A and paper photo2, the displacements of the highest chroma point in chroma ΔC2' and in lightness ΔL2' and the maximum expansion rate Rm2' are used. When creating an LUT 15f for the combination of ink set B and paper photo2, the displacements of the highest chroma point in chroma ΔC5' and in lightness ΔL5' shift and the shift coefficient in chroma RC1 ($\theta$)' are used.

Hereon, actual values are assigned, subject to constraints: ΔC1<ΔC2'>ΔC3, ΔL1<ΔL2'>ΔL3, Rm1<Rm2'>Rm3, ΔC4<ΔC5'>ΔC3, and ΔL4<ΔL5'>ΔL3. Besides, the shift coefficient in chroma RC1 ($\theta$)' is a function that gives a greater displacement by shift than the shift coefficient in chroma RC1 ($\theta$) does. In Embodiment 4, for the printer's color gamut for the combination of ink set A or B and paper photo2, the displacements by color gamut shift and color gamut expansion are set greater, though its size is smaller than the gamut for paper photo1. In other words, color gamut shift and color gamut expansion are executed with the set displacements conflicting with the tendency that displacements increase in proportional to increase in gamut size. This is intended to make the printer 40 output print results whose color tone will be as uniform as possible with all image processing media used.

When the printer 40 prints various kinds of images, a printed image usually includes a plurality of colors. The impression of a color that the user perceives somewhat changes by its color relativity to its surrounding color and its vividness is influenced by such relativity. Thus, while generally setting greater displacements by shift and expansion for larger color gamut, it is advisable to adjust the displacements, based on the test print results of various kinds of images output by the printer 40, so that the printer can print more vivid tone images. As the result of such adjustment, even for the medium size color gamut for the combination of ink set A or B and paper photo2, the displacements by shift and expansion may be set the greatest when creating its LUT as in Embodiment 4.

The adjustment of the displacements by shift and expansion, conflicting with the tendency that displacements increase in proportional to increase in gamut size, could be carried out for various intentions in addition to outputting print results whose color tone will be uniform with all image processing media used as described above. For example, if other color processing is performed before or after the processing of color gamut shift and color gamut expansion in accordance with the present invention, it may be required for a specific color gamut of printer that the displacements be corrected in conflict with the above tendency and the above processing of the invention be executed, in order to eventually make correction matching the above tendency as a whole including the processing of the invention.

(9) Preferred Embodiment 5

Figure 29:
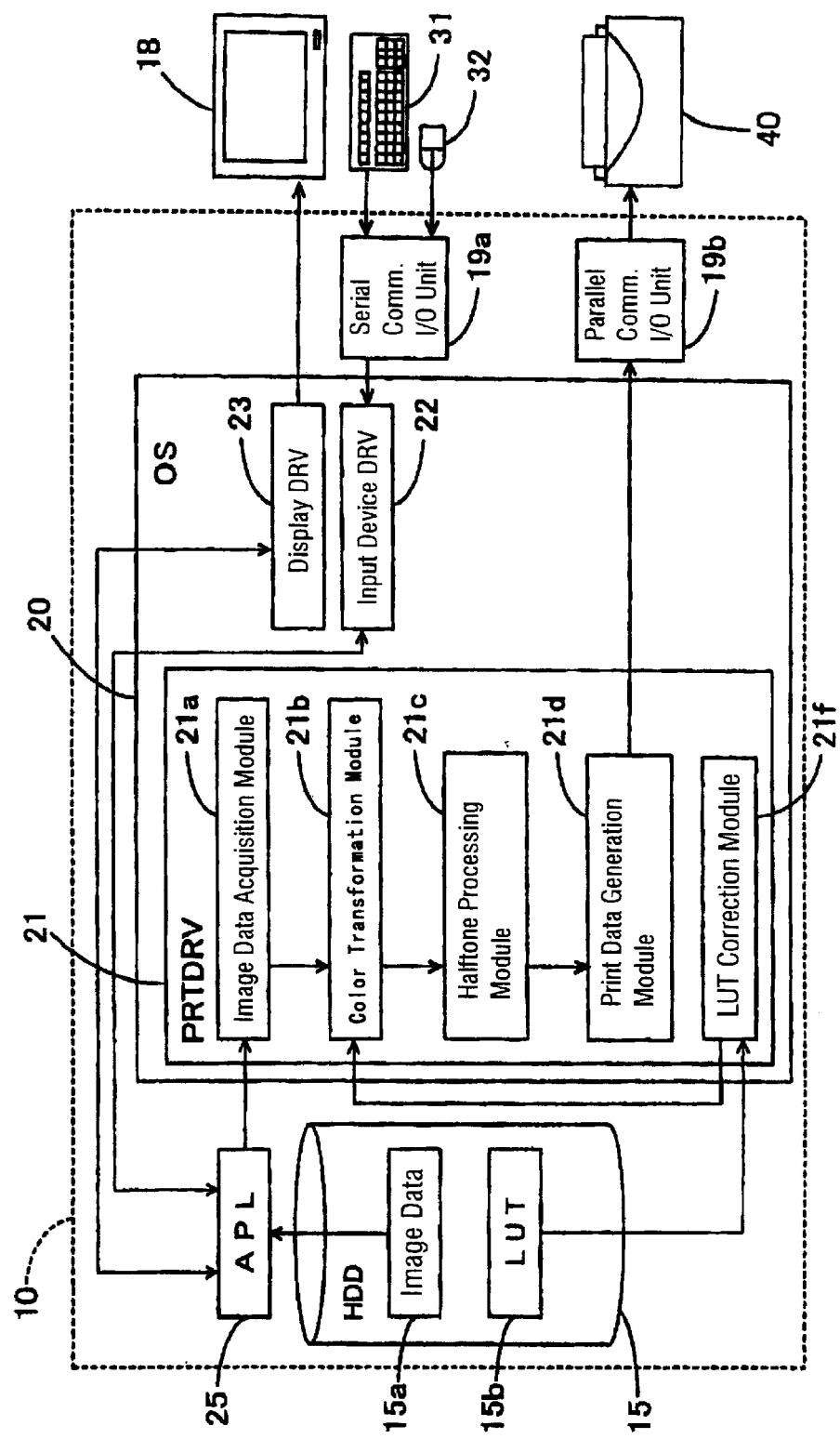
FIG. 29 is a block diagram showing the simplified structure of the OS and related components wherein the color transformation program is provided as the color transformation module, according to a preferred embodiment 5.

While a plurality of LUTs are created beforehand and arranged for different shapes of printer's color gamut in Embodiments 3 and 4, it is not always necessary to create a plurality of LUTs beforehand. For example, it is also possible to once create and maintain one LUT or a few LUTs and correct some part of the LUT as required for adaptation for a plurality of shapes of printer's color gamut. FIG. 29 shows the simplified structure of the OS and related components wherein a suitable LUT is created as required each time printing is performed so that color transformation suitable for a plurality of shapes of printer's color gamut will be executed under the PRTDRV 21.

In the structure shown in FIG. 29, which is nearly the same as that shown in FIG. 2, the PRTDRV 21 includes an LUT correction module 21f. The LUT correction module 21f makes the computer reference the LUT 15b which has previously stored in the disk on the HDD 15 and correct the LUT appropriately. In Embodiment 5, the module makes the computer execute correction by increasing or decreasing the chroma and lightness mainly for the data in the lightness range of 0 to 80 and in the region around the hue angle of 180°. In Embodiment 5 also, required information is obtained by receiving the status of printer 40 via the parallel communication I/O unit 19b and determining what image processing medium and ink set are in use, based on the print condition setting specified, using a Printer Properties window which is not shown.

To execute print operation, the PRTDRV 21 follows nearly the same the procedure as shown in FIG. 3, but the LUT correction module 21f applied in Embodiment 5 is activated before the color transformation module is activated in the step S110. Under the control of the LUT correction module 21f, the LUT 15b is retrieved and corrected, based on the information of the currently used image processing medium and ink set determined as described above. The thus corrected LUT is handed over to the color transformation module 21b under which color transformation of acquired image data is executed. Then, halftone processing and print data generation are executed, according to the procedure shown in FIG. 3 and eventually printing is performed.

In Embodiment 5, accordingly, even if a few LUTs are stored in the disk on the HDD 15, a suitable LUT is created for the currently used image processing medium and ink set on the printer 40 and images can be printed in more vivid colors than those presented on the display 18. For the correction method by the LUT correction module 21f, any of diverse methods can be adopted. For example, one method is as follows. The gamut mapping for color transformation is properly displaced in the region around the hue angle of 180° and in the lightness range of 0 to 80, based on the comparison in size between the printer's color gamut for which the LUT 15b has been created and maintained and the color gamut assumed for the currently used combination of image processing medium and ink set. Another method is as follows. By comparing the reference LUT 15b and another LUT for another printer's color gamut, color data of difference at sample points is maintained and a new LUT is set by replacing that color data of difference at sample points by newly obtained data.

(10) Preferred Embodiment 6

Figure 30:
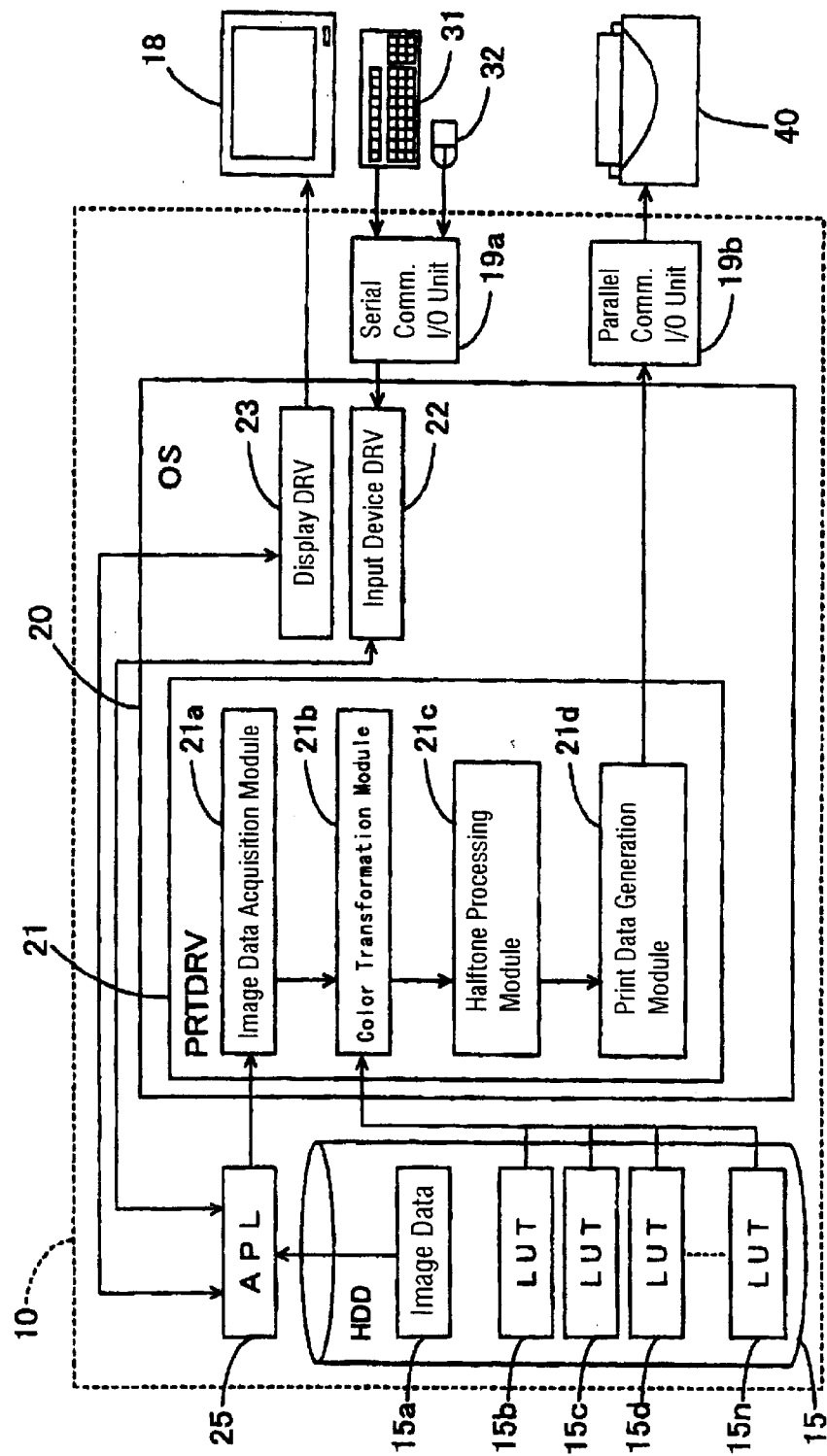
FIG. 30 is a block diagram showing the simplified structure of the OS and related components wherein the color transformation program is provided as the color transformation module, according to a preferred embodiment 6.

Using LUTs created through the processing of color gamut shift and color gamut expansion in accordance with the present invention is advantageous in that unnatural color transformation is prevented and color gamut can be effectively used. On the other hand, it is advisable to enable the user to choose whether to use LUTs provided in accordance with the present invention to meet the user's need that may differ, according to circumstances. FIG. 30 shows the simplified structure of the OS and related components wherein LUTs, some of which have been created through the processing of color gamut shift and color gamut expansion in accordance with the present invention, and some of which have been created without being modified by such processing, are made available under the PRTDRV 21. In the structure shown in FIG. 30, which is nearly the same as that shown in FIG. 2, arrangement is made such that the color transformation module 12b of the PRTDRV 21 selectively uses an appropriate LUT out of the LUTs 15b to 15c, according to mode setting specified in advance.

The LUTs 15b to 15n includes those defined for each combination of image processing medium and ink set as described above and those created without being modified by color gamut shift and color gamut expansion. Specifically, LUTs for a combination of image processing medium and ink set are classified into an LUT created through color gamut shift, an LUT created through color gamut expansion, an LUT created through color gamut shift and color gamut expansion, and an LUT created without being modified by color gamut shift and color gamut expansion, which are stored in the disk on the HDD 15.

Figure 31:
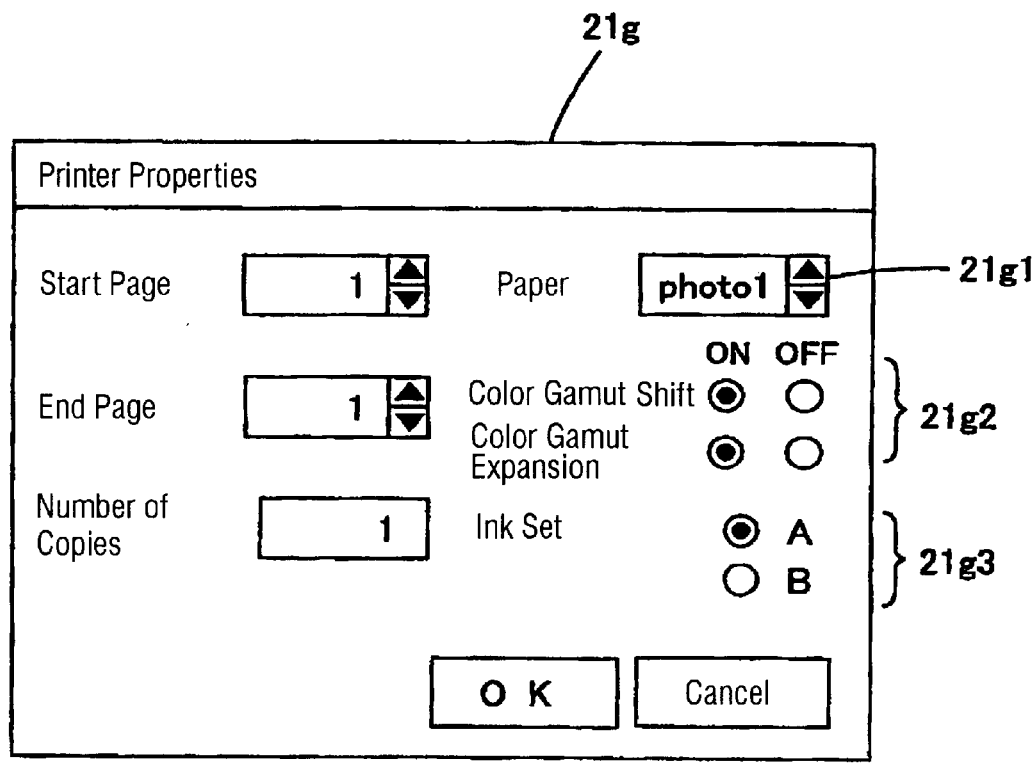
FIG. 31 shows an exemplary Printer Properties window.

Under the control of PRTDRV 21, the computer presents a Printer Properties window 21g on the display 18 when executing print operation; an example of this window is shown in FIG. 31. The Printer Properties window 21g have entry boxes for start page, end page, the number of copies, and other information required for printing, and the OK button to be used to request print execution, the Cancel button to be used to abort print operation, and the like. Inputs to the Printer Properties window 21g can be performed through the keyboard 31 and mouse 32.

In Embodiment 6, other information required for printing can be input, using the Printer Properties window 21g, and the PRTDRV21 selects an appropriate LUT, based on the information furnished. Specifically, the Printer Properties window 21g are provided with a paper select box 21g1, mode select radio buttons 21g2, and ink set select radio buttons 21g3. The paper select box 21g1 allows the user to select paper to be used on the printer 40 from a pull-down menu listing preset kinds of paper. The ink set select radio buttons 21g3 allow the user to select an ink set to be used on the printer 40 by checking either radio button.

The mode select radio buttons 21g2 allows the user to choose whether to use LUTs created through color gamut shift and color gamut expansion by checking the radio buttons ON/OFF. Based on user-preference setting, the color transformation module 21 of the PRTDRV 21 makes the computer extract an LUT suitable for the selected medium, ink set, and processing mode from the HDD 15 and execute color transformation. If only the radio button of color gamut shift is set ON, an LUT created through color gamut shift is extracted. If only the radio button of color gamut expansion is set ON, an LUT created through color gamut expansion is extracted. If both radio buttons of color gamut shift and color gamut expansion are set ON, an LUT created through color gamut shift and color gamut expansion is extracted. If both radio buttons of color gamut shift and color gamut expansion are set OFF, an LUT created without being modified by color gamut shift and color gamut expansion is extracted.

In this way, in Embodiment 6, whether to use LUTs created through color gamut shift or/and color gamut expansion can be set, according to user preference, and whether to print an image presented on the display 18 with chroma emphasized by using LUTs provided in accordance with the present invention can be determined at the discretion of the user. If LUTs have been created without being modified by color gamut shift and color gamut expansion for some purpose, it can be said that Embodiment 6 allows for choice between such purpose and the purpose of the present invention when executing print operation. For example, if LUTs created without being modified by color gamut shift and color gamut expansion are suitable for reproducing colors visible on the display 18 as faithfully as possible, Embodiment 6 allows for choice of whether to print in exactly the same colors as visible on the display 18.

In Embodiment 6, options may be arranged in different ways. Instead of providing options allowing for choice between LUTs created through color shift gamut and LUTs created through color gamut expansion, it is possible to provide options for choice between LUTs created through both processing and those created being without modified by both. As labels of options for LUTs, instead of the explicit ones shown in FIG. 31 for choice of color gamut shift and color gamut expansion, a sensuous word may be used that allows the user to appreciate and select a mode. In simpler arrangement of options for LUTs, in the same configuration as shown is FIG. 31, for a combination of image processing medium and ink set, LUT created through both color gamut shift and color gamut expansion and LUT created without being modified both processing are stored in the disk on the HDD 15.

Figure 32:
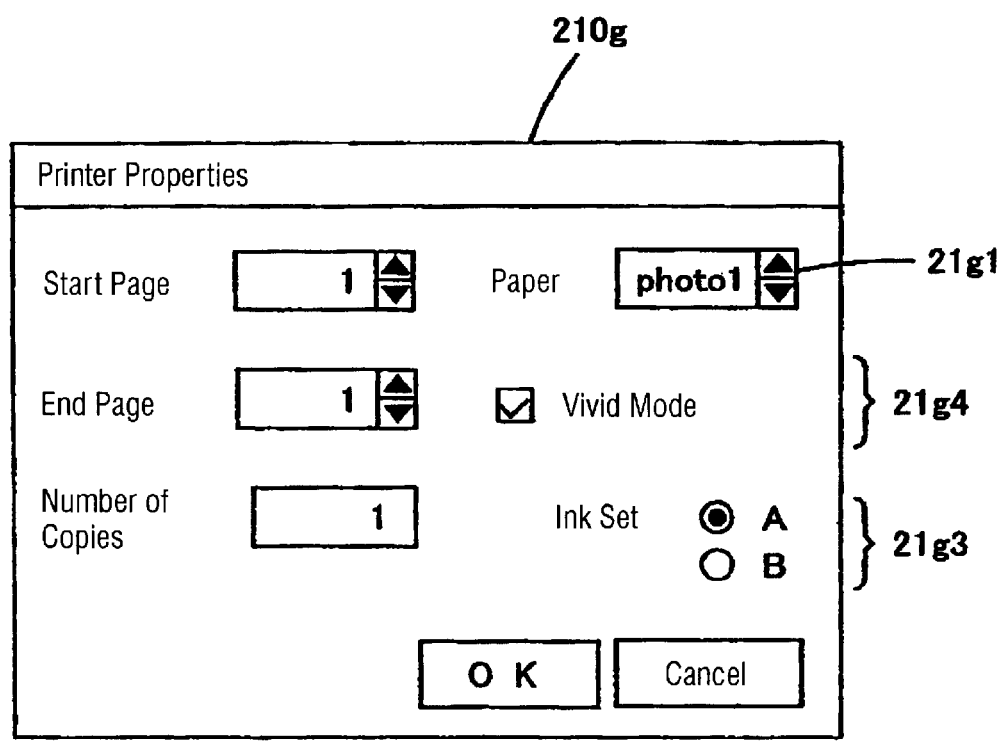
FIG. 32 shows another exemplary Printer Properties window.

Under the control of the PRTDRV 21, instead of the Printer Properties window 21g shown in FIG. 31, for example, a Printer Properties window 210g which is shown in FIG. 32 maybe presented. On the Printer Properties window 210g, a mode select checkbox 21g4 instead of the radio buttons for mode selection on the window shown in FIG. 31 is provided for allowing the user to choose whether to apply a vivid mode. When the checkbox is checked, the color transformation module 21b of the PRTDRV 21 makes the computer execute color transformation, using an LUT created through both color gamut shift and color gamut expansion.

Accordingly, an image shown on the display 18 is printed in colors that are more vivid. When the checkbox is not checked, the color transformation module 21b of the PRT-DRV 21 makes the computer execute color transformation, using an LUT created without being modified by both color gamut shift and color gamut expansion. If a rather sensuous word is used as the label of a mode, even beginners not having sufficient knowledge could easily carry out printing with an appropriate LUT selected by their preference.

As explained above, in accordance with the present invention, color gamut shift is executed to obtain gamut mapping in which the shape of the color gamut of a first image processing device expands so as to be close to the shape of the color gamut of a second image processing device in a homogenous hue range and color gamut expansion is further executed to obtain gamut mapping in which a certain region of the resulting gamut after the color gamut shift further expands into the color gamut of the second image processing device. Based on the relationship between the color gamuts of the first image processing device and the second image processing device defined by the foregoing processing execution, color transformation is executed. In circumstances where a plurality of color gamuts are available on an image processing device are available, gamut mapping relationships between the first and second devices are defined for each gamut, thereby finer adjustment can be performed. Thus, image output in desirable colors can be obtained by making effective use of the color gamuts of the image processing device.

The present invention may be embodied in other specific forms without departing from the spirit or essential characteristics thereof. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within the scope of the claims.

We claim:

1. A printing apparatus for transforming first color image data for use on a first image processing device, into second color image data for use in printing by referencing a color transformation lookup table, and thereby printing, wherein said color transformation lookup table has a first set of values and a second set of values which represent a relationship between color gamuts of the first image processing device and the second image processing device, and if there exists the region that is out of the color gamut of the first image processing device but fails within the color gamut of the second image processing device in a certain hue of a device-independent color space, said relationship is equivalent to the relationship of color gamut determined, based on gamut mapping in a pre-defined device-independent color space, through a process comprising:

a color gamut shift step to obtain the mapping which expands the shape of the color gamut of the first image processing device so as to be close to the shape of the color gamut of the second image processing device in a homogeneous hue range; and a color gamut expansion step to obtain the mapping which expands a certain region of the resulting gamut processed at said color gamut shift step into the inside of color gamut of the second image processing device.

2. A printing method comprising inputting first color image data for use on a first image processing device, transforming the first color image data into second color image data for use in printing by referencing a color transformation lookup table, and thereby printing, wherein said color transformation lookup has a first set of values and a second set of values which represent a relationship between color gamuts of the first image processing device and the second image processing device, and if there exists the region that is out of the color gamut of the first image processing device but falls within the color gamut of the second image processing device in a certain hue of a device-independent color space, said relationship is equivalent to the relationship of color gamut determined, based on gamut mapping in the predefined device-independent color space, through a process comprising a color gamut shift operation that creates a color gamut shift mapping that overlaps the second color gamut more closely than the first color gamut overlaps the second color gamut in a homogeneous hue range of a device-independent color space; and a color gamut expansion step to obtain the mapping which expands a certain region of the resulting gamut processed at said color gamut shift step into the inside of color gamut of the second image processing device; and wherein printing is performed by referencing said color transformation lookup table to transform the first color image data into second color image data.

3. A medium recording a computer-executable printing program for causing a computer to perform the computer-implemented actions of inputting first color image data for use on a first image processing device, transforming the first color image data into second color image data for use in printing by referencing a color transformation lookup table, and thereby printing, wherein said color transformation lookup table has a first set of values and a second set of values which represent a relationship between color gamuts of the first image processing device and the second image processing device, and comprising at least one of the set of values in the color lookup table include values determined by the equivalent of:

a color gamut shift operation that creates a color gamut shift mapping that overlaps the second color gamut more closely than the first color gamut overlaps the second color gamut in a homogeneous hue range of a device-independent color space; and a color gamut expansion step to obtain the mapping which expands a certain region of the resulting gamut processed at said color gamut shift step into the inside of color gamut of the second image processing device, and wherein said printing program comprises code configured to:

transform the first color image data into the second color image data by referencing said color transformation lookup table, transform the second color image data into print data, and output the print data to a printer, thereby executing printing.

4. A color transformation apparatus arranged to receive first color image data for use on a first image processing device and transforming the first color image data into second color image data for use on a second image processing device, wherein, the color gamut of the first image processing device and the color gamut of the second image processing device can be mapped in a color space where colors can be defined in terms of lightness, chroma, and hue, and at the hue in which a region exists where the color gamut of the second image processing device is wider than the color gamut of the first image processing device in low lightness and high chroma ranges, said color transformation apparatus being further arranged to:

shift the color gamut of the first image processing device toward lower lightness and higher chroma;

expand the chroma of the resulting gamut after the color gamut shift to move the resulting gamut toward a region where the gamut of the second image processing device is wider in chroma;

compressing a region that falls out of the color gamut of the second image processing device after the color gamut expansion so that the region will enter the color gamut of the second image processing device;

defining a color transformation table in which color values by the coordinates of the finally obtained gamut are mapped to color values by the coordinates of the original color gamut of the first image processing device; and transforming the first color image data into the second color image data, based on the color transformation table.

5. A computer readable medium comprising a color transformation program recorded thereon for inputting RGB data for use on a display and transforming the RGB data into CMY data for use on a printer, wherein, after mapping the color gamut of the display device and the color gamut of the printer in a color space where colors can be defined in terms of lightness, chroma, and hue, for a sector of hues in which a region exists where the color gamut of the printer device is wider than the color gamut of the display in low lightness and high chroma ranges, said color transformation program is suitable for causing a computer to perform the computer-implemented actions of:

color gamut shift by which the color gamut of the display shifts toward lower lightness and higher chroma ranges such that the highest chroma point in the color gamut of the display in a hue will shift by the greatest displacement and the lower the chroma of a point from where to shift, the smaller will be the displacement of the point, wherein the color gamut shift is executed for all hues in said sector so that the farther from the center of the sector, the smaller will be the displacement by shift;

color gamut expansion by which the resulting gamut after the color gamut shift expands toward a higher chroma range such that, in a lightness range in which the chroma of the color gamut of the printer is higher than that of the resulting gamut, the higher the chroma of a point, the greater will be the displacement of the point, wherein the color gamut expansion is executed for all hues in said sector so that the farther from the center of the sector, the smaller will be the displacement by expansion;

compressing a region that falls out of the color gamut of the printer after the color gamut expansion toward the center of the color space, creating a color transformation table in which color values by the coordinates of the finally obtained gamut are mapped to color values by the coordinates of the original color gamut of the display;

storing in advance the color transformation table into predetermined storage area; and transforming the RGB data into the CMY data, based on the color transformation table.

6. A method of transforming first color image data associated with a first image processing device having a first color gamut to second color image data associated with a second image processing device having a second color gamut wherein the second color gamut includes a region that is outside of the first color gamut, the method comprising:
 a color gamut shift operation that creates a color gamut shift mapping that overlaps the second color gamut more closely than the first color gamut overlaps the second color gamut in a homogeneous hue range of a device-independent color space; and
 a color gamut expansion operation that creates a color gamut expansion mapping that expands a selected region of a color gamut within the second color gamut, whereby the color gamut expansion mapping is within the second color gamut.

7. A method as recited in claim 6 wherein:
 the first image processing device is a display and the second image processing device is a printer, and
 the first color image data is expressed in an RGB color space and the second color image data is expressed in a CMYK color space.

8. A method as recited in claim 6, wherein:
 said color gamut shift step causes lightness to decrease and chroma to increase based on the coordinates of said device-independent color space; and
 said color gamut expansion step causes chroma to increase while keeping lightness nearly constant, based on the coordinates of the gamut processed at the color gamut shift step in said device-independent color space.

9. A method as recited in claim 6, wherein the mapping in the color gamut shift step is arranged such that higher chroma points in the color gamut of the first image processing device at a constant hue, have greater shift displacements.

10. A method as recited in claim 6, wherein the color gamut shift step shifts any of or combination of the group consisting of hue, chroma, and lightness of the first color image data.

11. A method as recited in claim 6, wherein the expanding in the color gamut expansion step is arranged such that the higher the chroma of the first color gamut is, the greater the displacement by expansion is.

12. A method as recited in claim 6 wherein the color gamut shift operation is performed prior to the color gamut expansion operation and the selected region of a color gamut is a region of the color gamut shift mapping.

13. A method as recited in claim 6 wherein in the color gamut expansion step, drama expansion is generally performed but is not performed on a certain region of the color gamut where the expansion would be small.

14. A method as recited in claim 6, wherein the color gamut expansion step causes expansion of any one or combination selected from the group consisting of hue, chroma, and lightness of the color gamut shift mapping.

15. A method as recited in claim 6, wherein said relationship in said color transformation lookup table is defined by individual displacement by shift or/and displacement by expansion to be pertained for each of the color gamuts in the device-independent color space.

16. A method as recited in claim 6, wherein in the shifting in the color gamut shift step is arranged such that larger the color gamut of the second image processing device is, the greater the displacement by shift is.

17. A method as recited in claim 16, wherein the shift displacement in the color gamut shift step is arranged such that the smaller the exceptional color gamut of the second image processing device is, the greater the shift displacement is.

18. A method as recited in claim 6, wherein hue displacement is restricted to 15 degrees or less L*a*b* space.

19. A method as recited in any of claim 6–18 further comprising creating a color transformation lookup table to represent the transformation of the first color image data to the second color image data based on the color gamut expansion mapping.

20. A printing method comprising:
 receiving first color image data suitable for rendering an image on a first image processing device, the first image processing device having an associated first color gamut;
 transforming the first color image data into second color image data for use in printing by referencing a color transformation lookup table; and
 printing the image using the second color image data, wherein a printer used to print the image has an associated second color gamut that includes a region that is outside of the first color gamut; and
 wherein the values in the color transformation lookup table include values determined by:
 a color gamut shift operation that creates a color gamut shift mapping that overlaps the second color gamut more closely than the first color gamut overlaps the second color gamut in a homogeneous hue range of a device-independent color space; and
 a color gamut expansion operation that creates a color gamut expansion mapping that expands a selected region of a color gamut within the second color gamut, whereby the color gamut expansion mapping is within the second color gamut.

21. A printing method as recited in claim 20 wherein in the lookup table value determination, to color gamut shift operation is performed prior to the color gamut expansion operation and the selected region of a color gamut is a region of the color gamut shift mapping.

22. A method as recited in claim 20, wherein the color lookup table includes a first set of values which represent the relationship between the first color image data and the second color image data with the application of color gamut shift and color gamut expansion and a second set of values which represent the relationship between the first color image data and the second color image data without the application of the color gamut shift and color gamut expansion, the method further comprising receiving a user selection which indicates the set of values to be utilized for a particular transformation.

23. A color lookup table embodied in a computer readable media for transforming first color image data associated with a first image processing device having a first color gamut to second color image data associated with a second image processing device having a second color gamut wherein the second color gamut includes a region that is outside of the first color gamut and the values in the color lookup table include values determined by:
 a color gamut shift operation that creates a color gamut shift mapping that overlaps the second color gamut more closely than the first color gamut overlaps the second color gamut in a homogeneous hue range of a device-independent color space; and
 a color gamut expansion operation that creates a color gamut expansion mapping that expands a selected region of a color gamut within the second color gamut, whereby the color gamut expansion mapping is within the second color gamut.

24. A color lookup table as recited in claim 23, wherein:

the second image processing device is capable of rendering images with different numbers of color components; and the color lookup table includes a first set of values indicative of a first color transformation to a first set of colors and a second set of values indicative of a second color transformation to a second set of colors.

25. A color lookup table as recited in claim 23, wherein at least one of the first and second image processing devices is capable of rendering images in distinct manners that use different color gamuts and the color lookup table includes multiple sets of values and each set of values corresponds to a unique combination of color gamuts associated with the first and second image processing devices.

26. A color lookup table as recited in claim 23, wherein the color lookup table includes a first set of values which represent the relationship between the first color image data and the second color image data with the application of color gamut shift and color gamut expansion and a second set of values which represent the relationship between the first color image data and the second color image data without the application of the color gamut shift and color gamut expansion.

27. A printing apparatus comprising:

a printing mechanism; and a color lookup table as recited in claim 23.

28. A method of generating a color lookup table suitable for use in transforming first color image data associated with a first image processing device having a first color gamut to second color image data associated with a second image processing device having a second color gamut wherein the second color gamut includes a region that is outside of the first color gamut, the method comprising:

a color gamut shift operation that creates a color gamut shift mapping that overlaps the second color gamut more closely than the first color gamut overlaps the second color gamut in a homogeneous hue range of a device-independent color space;

a color gamut expansion operation that creates a color gamut expansion mapping that expands a selected region of a color gamut within the second color gamut, whereby the color gamut expansion mapping is within the second color gamut; and generating a lookup table having a first set of values that correspond to a selected set of color points in the first color gamut and a second set of values that represent the transformed selected set of points in the second color gamut, wherein the second set of values is derived from the color gamut expansion mapping.

29. A method as recited in claim 28 wherein the color gamut shift operation is performed prior to the color gamut expansion operation and the selected region of a color gamut is a region of the color gamut shift mapping.

* * * * *

UNITED STATES PATENT AND TRADEMARK OFFICE
CERTIFICATE OF CORRECTION

PATENT NO.     : 6,765,586 B2
DATED          : July 20, 2004
INVENTOR(S)    : Yamazaki et al.

It is certified that error appears in the above-identified patent and that said Letters Patent is hereby corrected as shown below:

Column 32,
Line 41, change "fails within" to -- falls within --.

Signed and Sealed this

Fourth Day of January, 2005

JON W. DUDAS
*Director of the United States Patent and Trademark Office*